Aug. 18, 1925.
L. B. SMITH
1,550,587
STOVEPIPE MAKING MACHINE
Filed Dec. 11, 1922 15 Sheets-Sheet 4
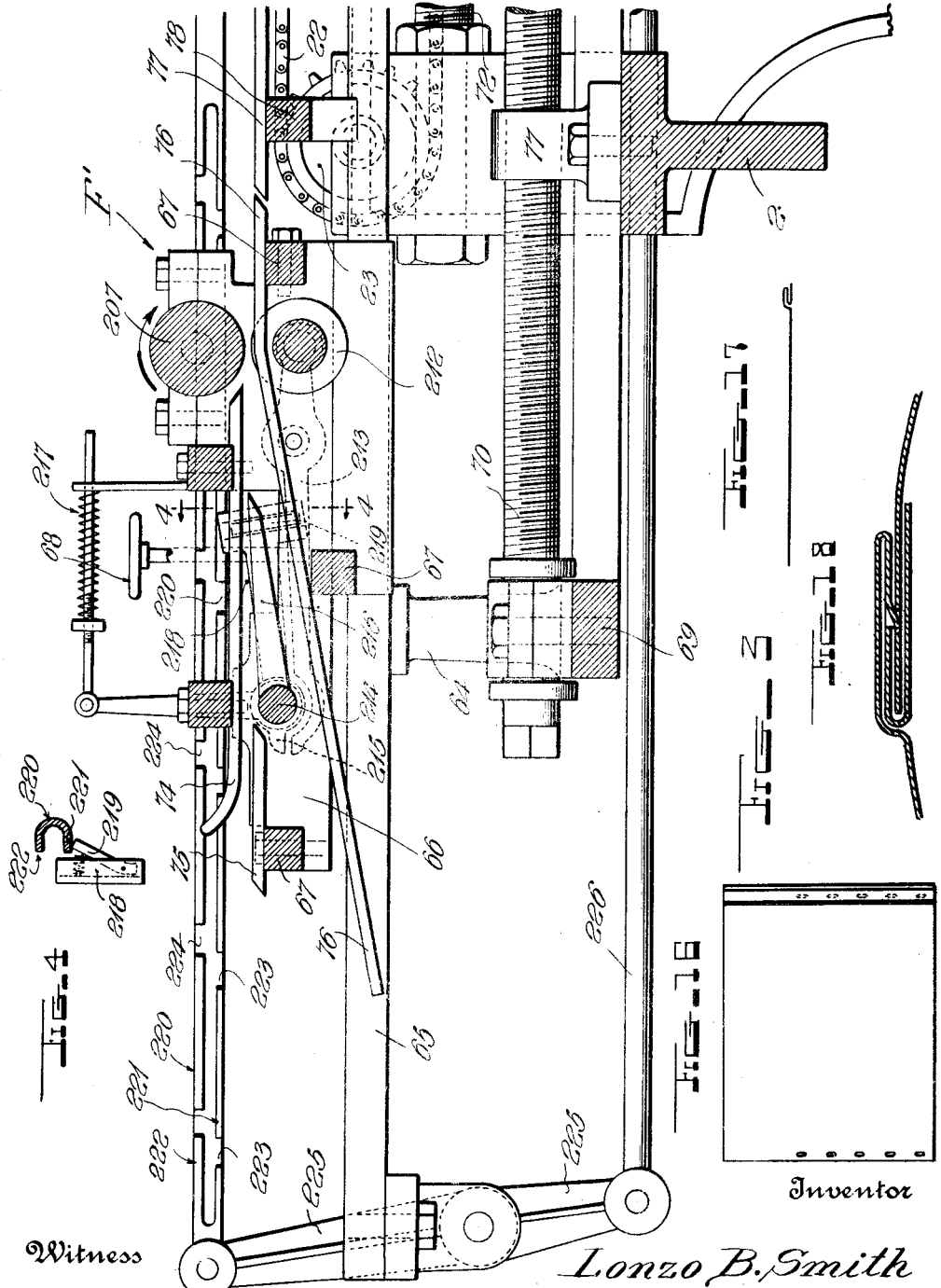
Inventor
Lonzo B. Smith
By H. B. Wilson &co.
Attorneys

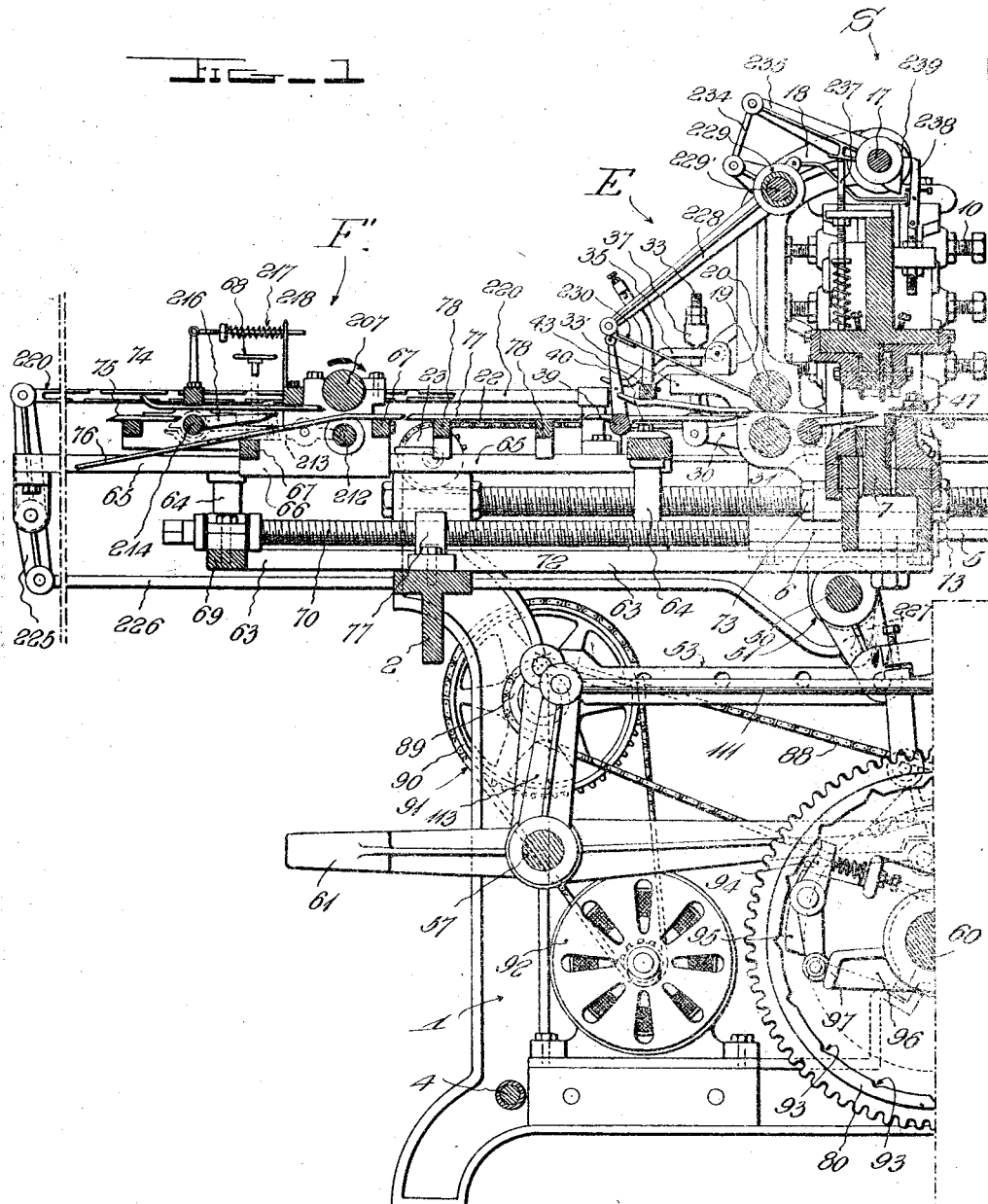

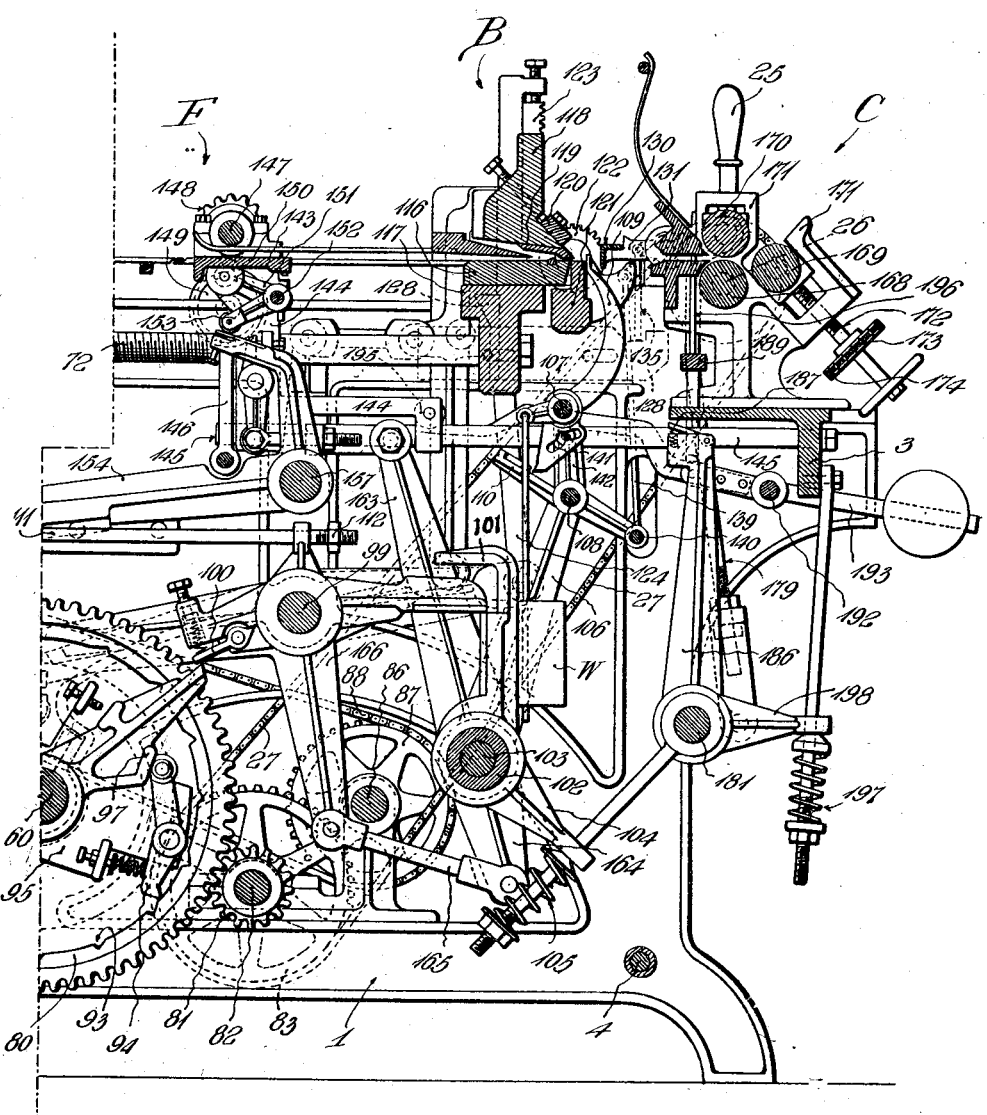

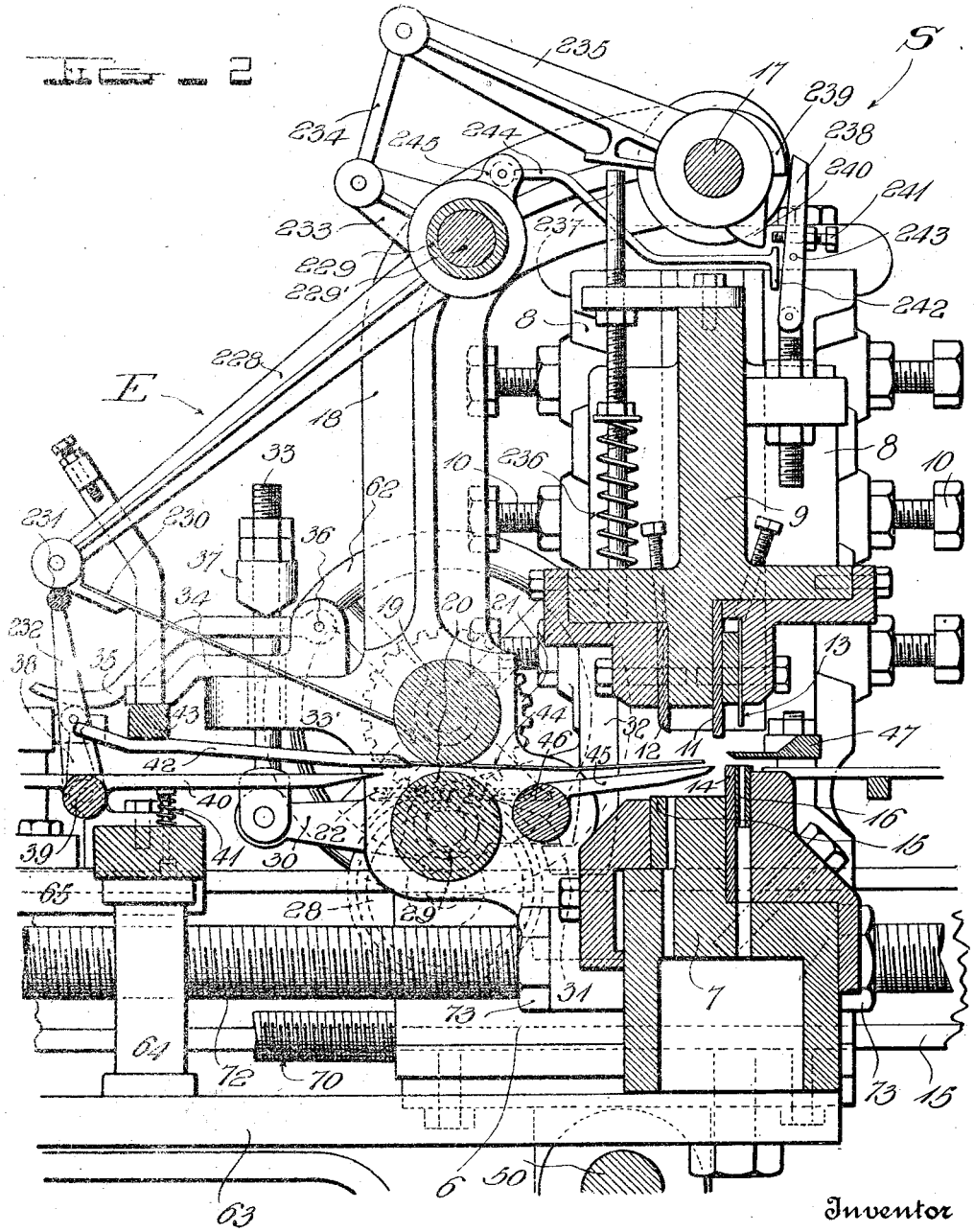

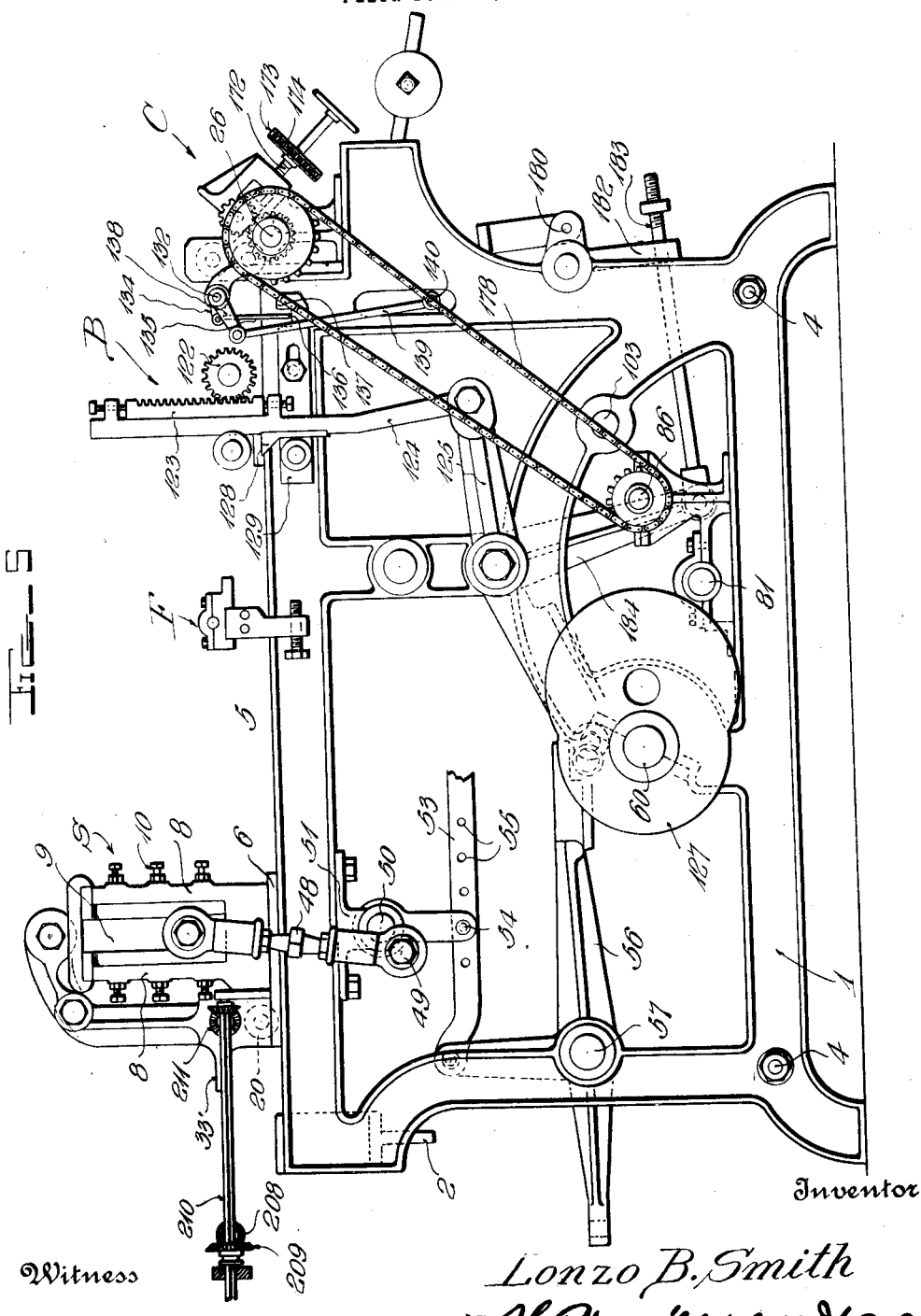

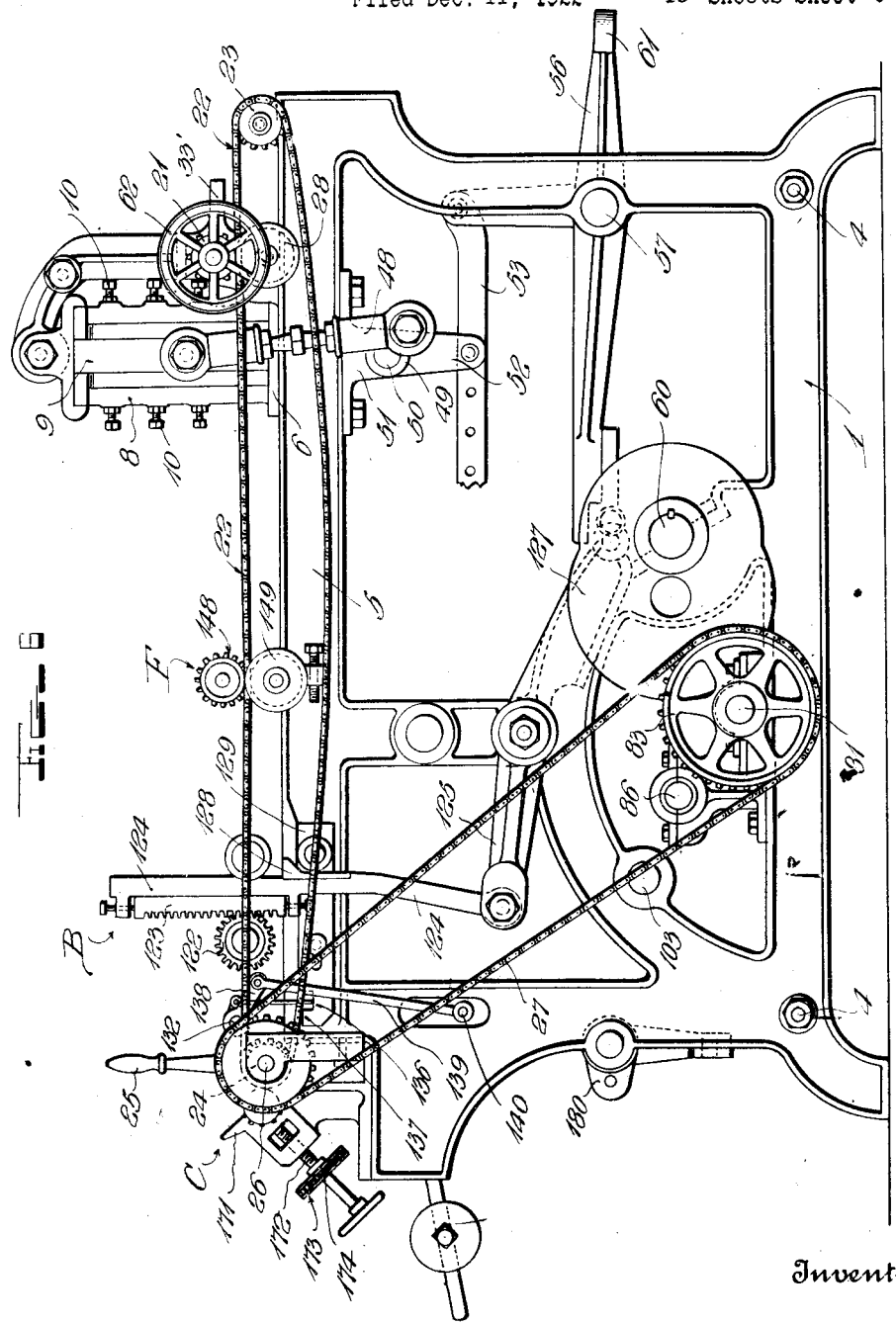

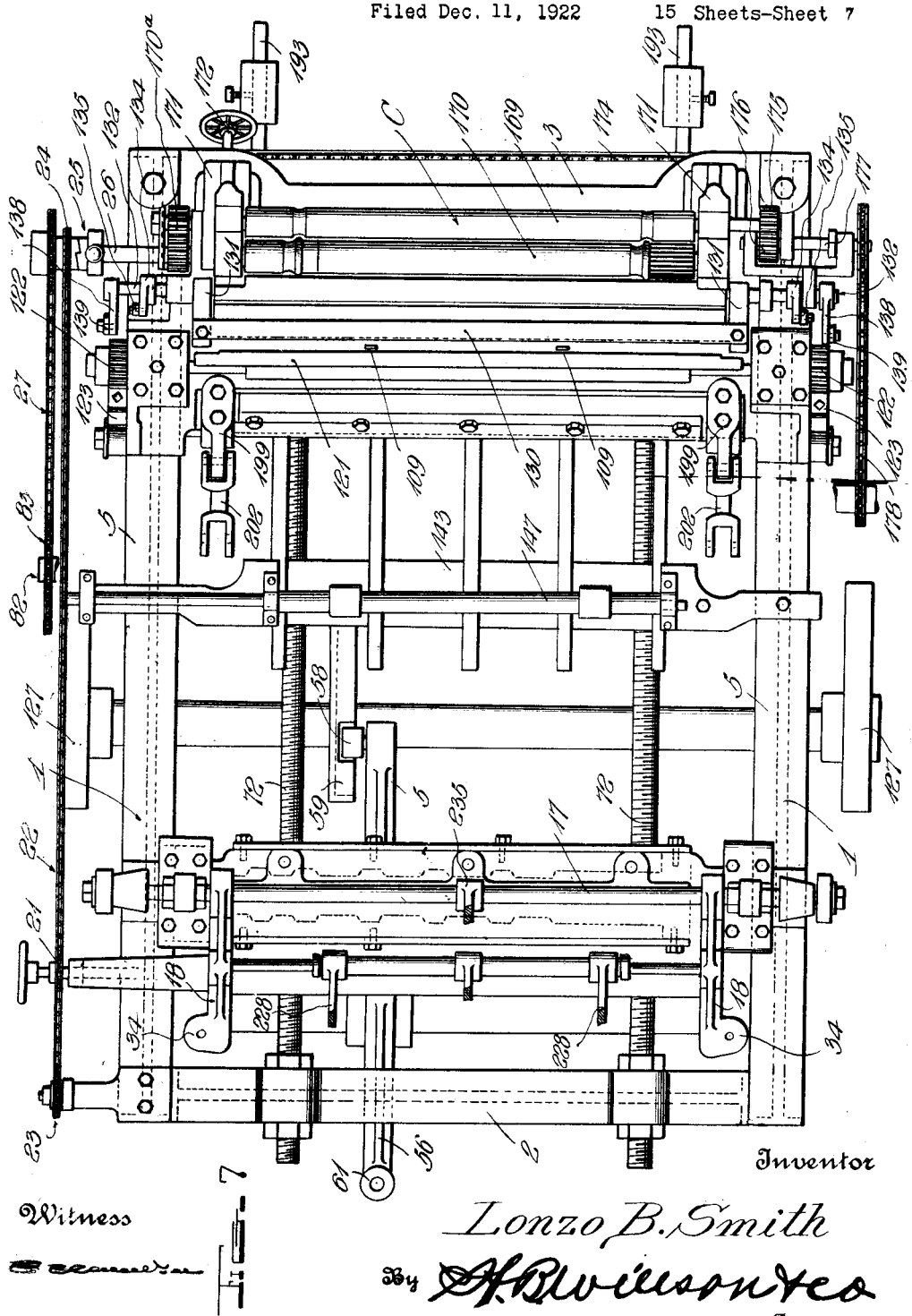

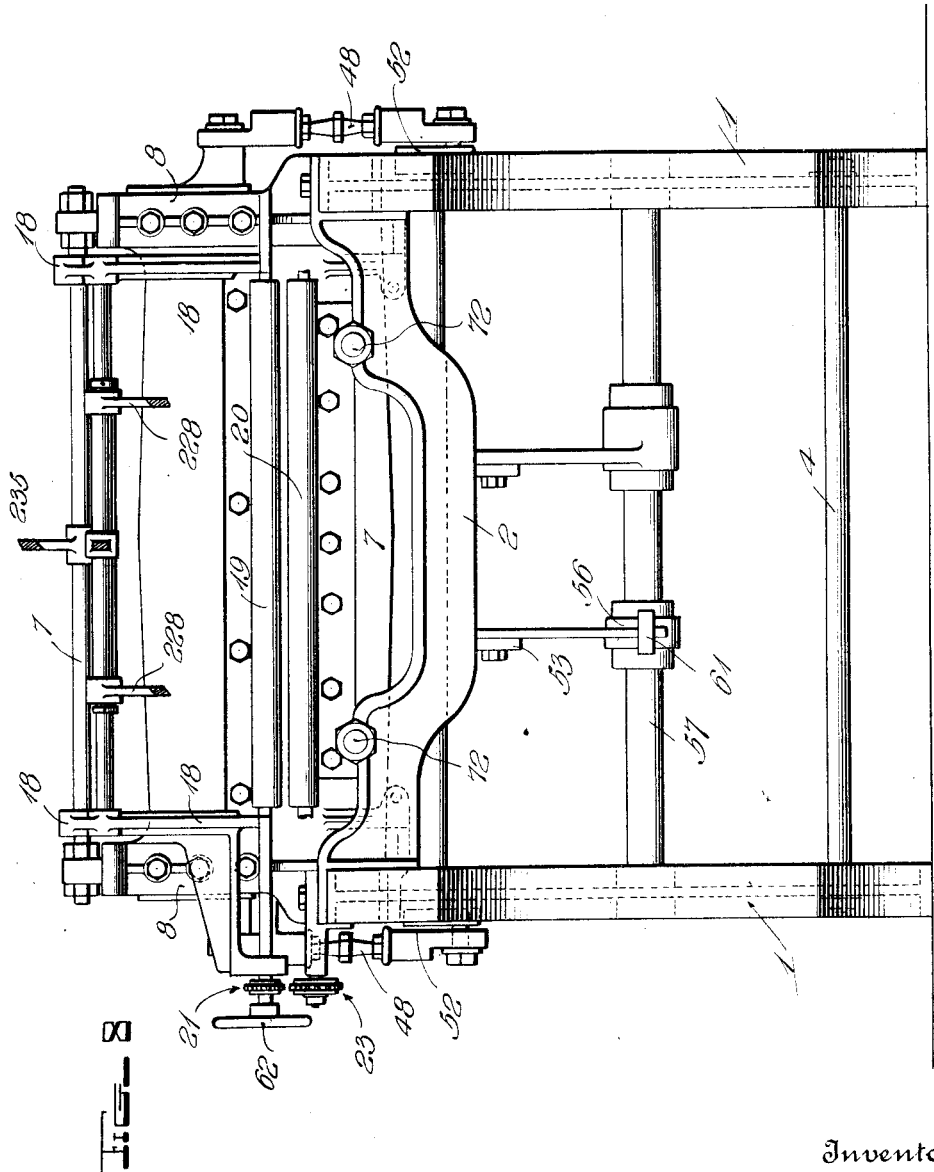

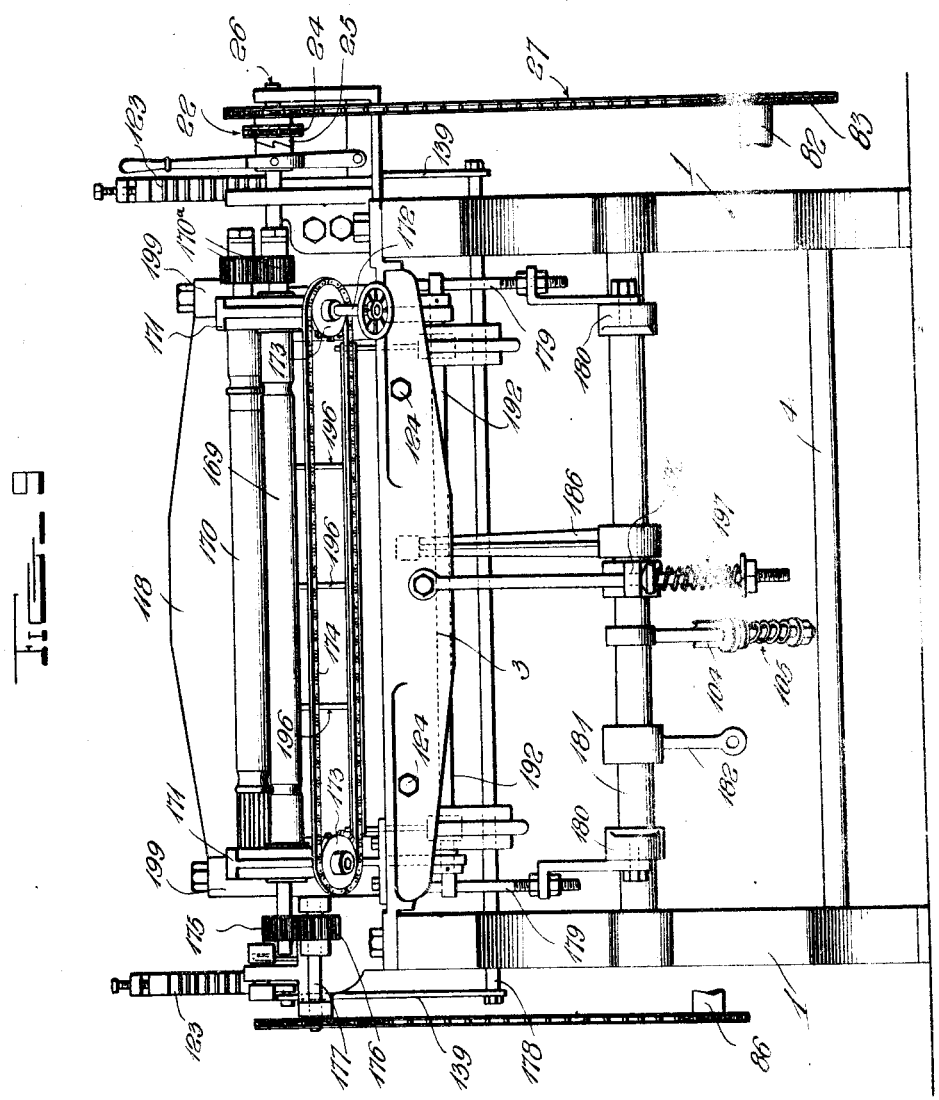

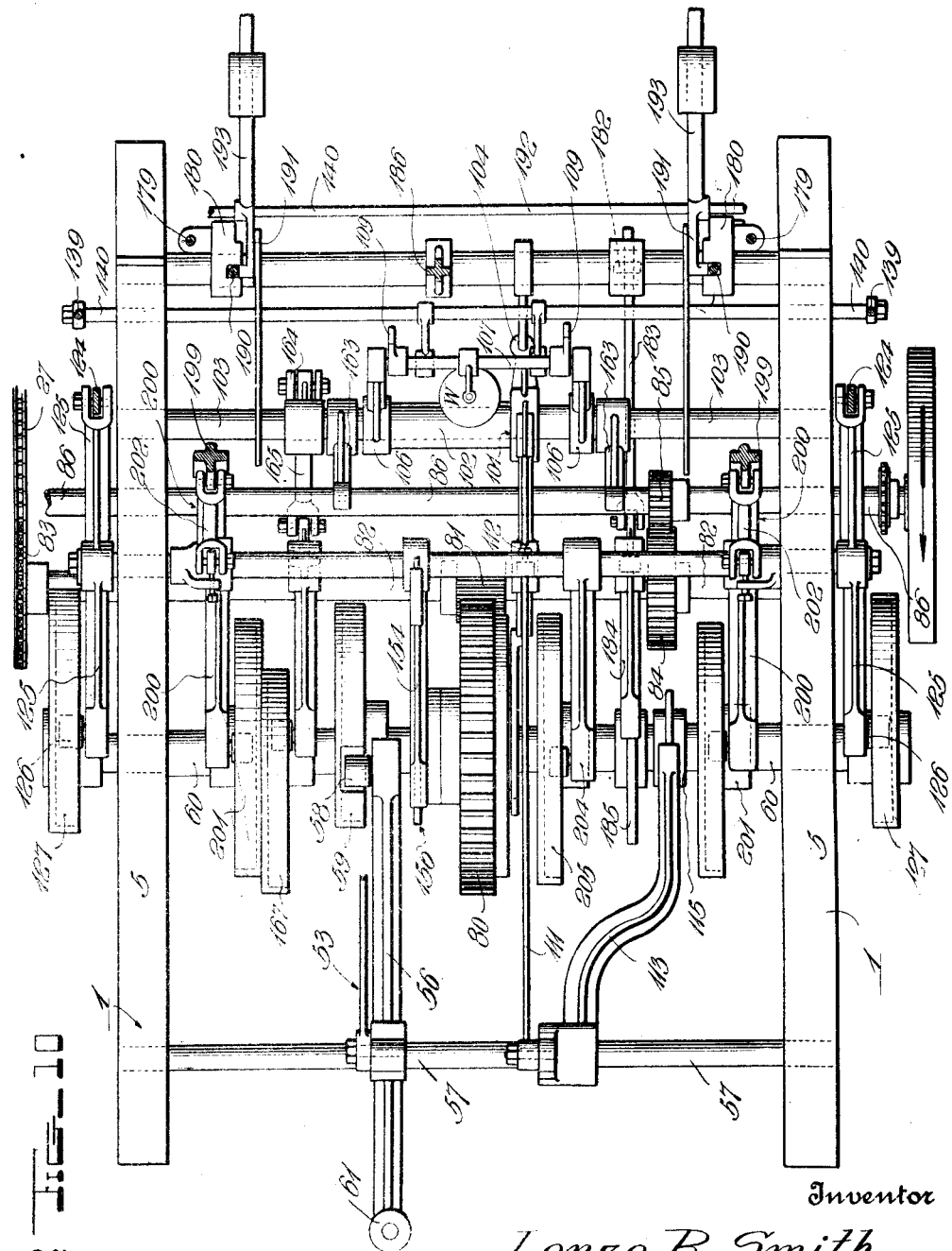

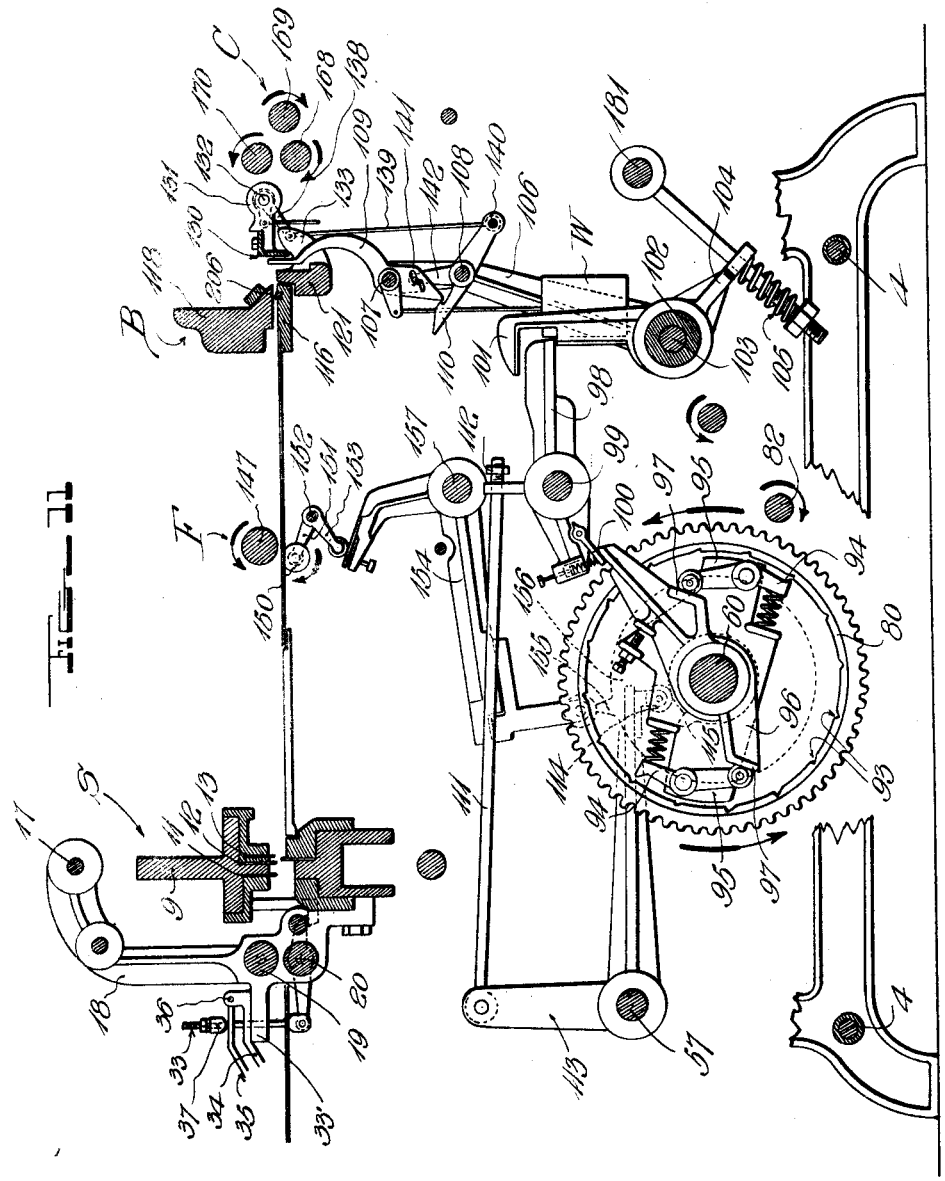

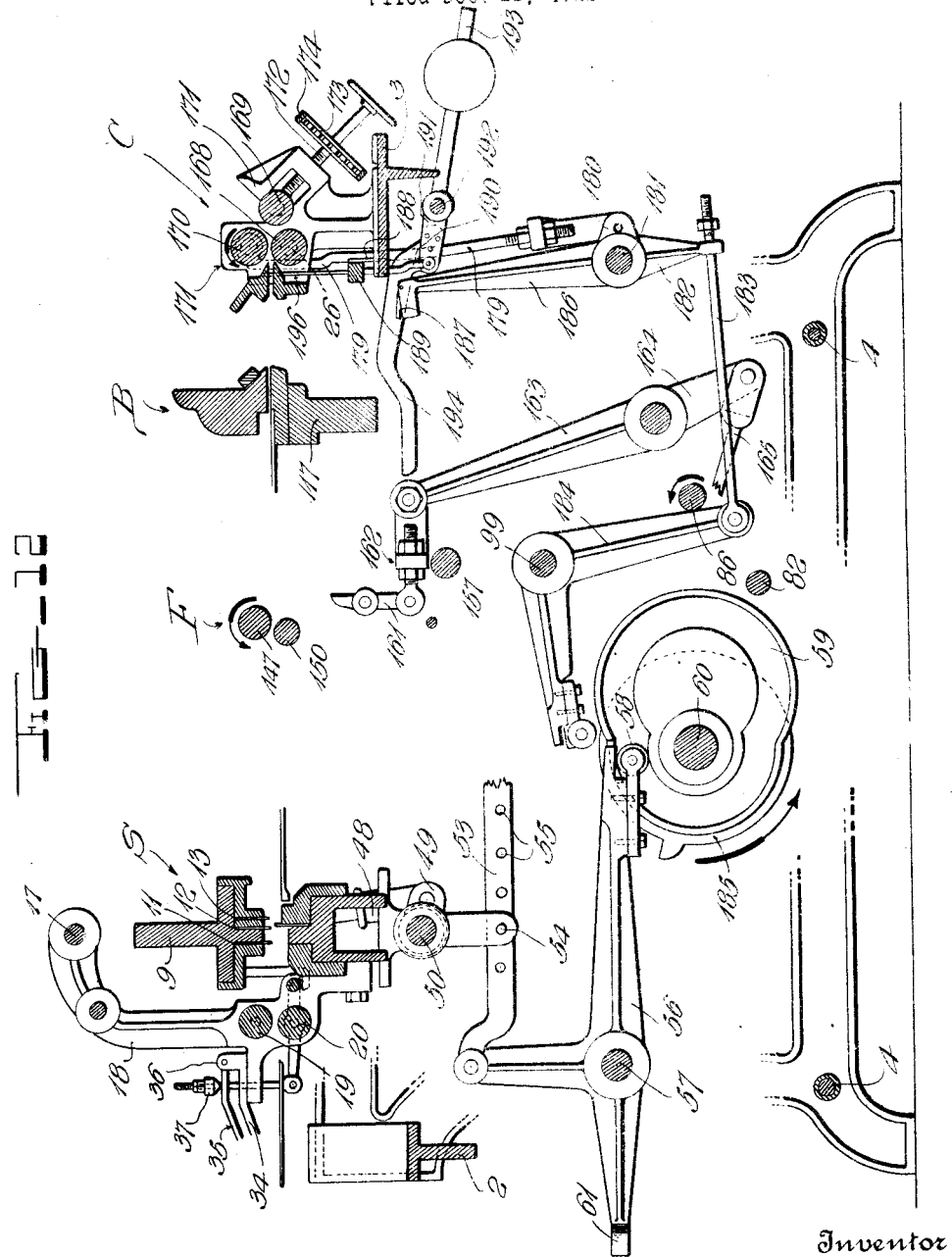

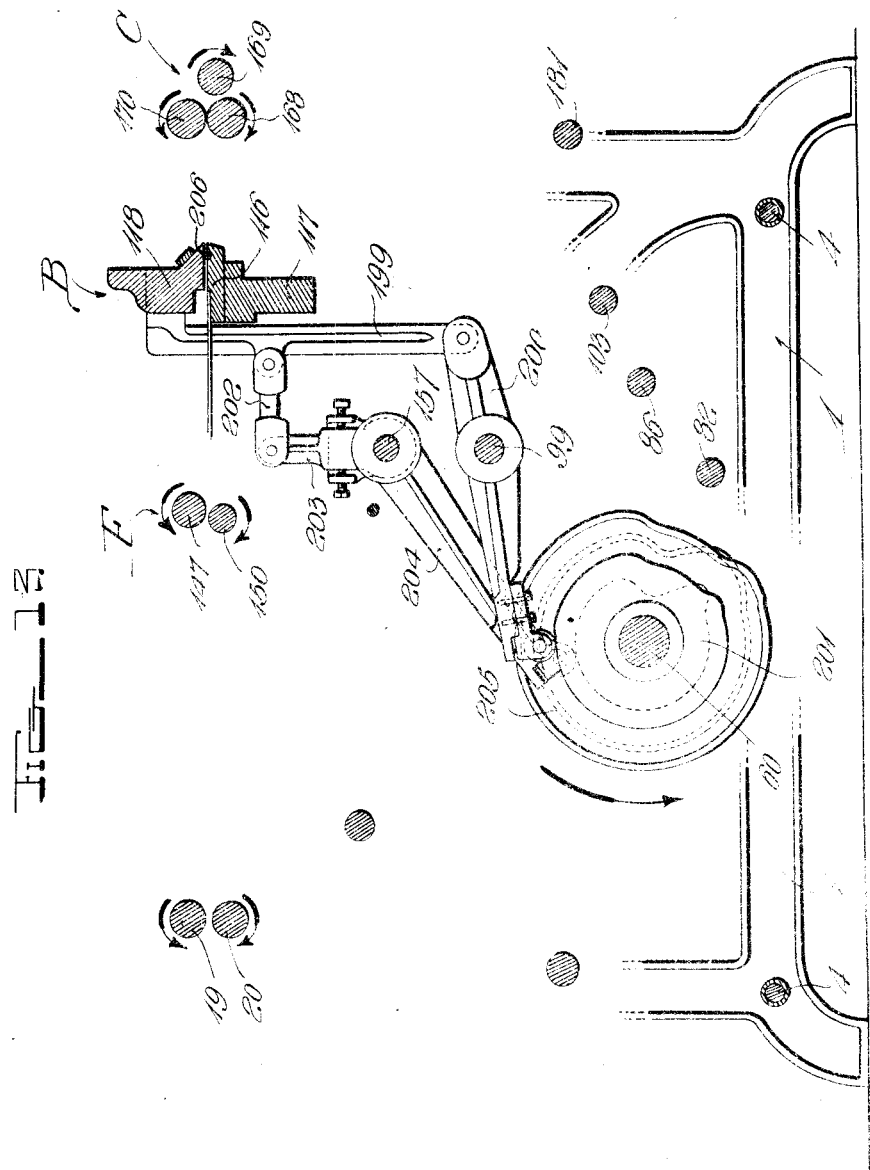

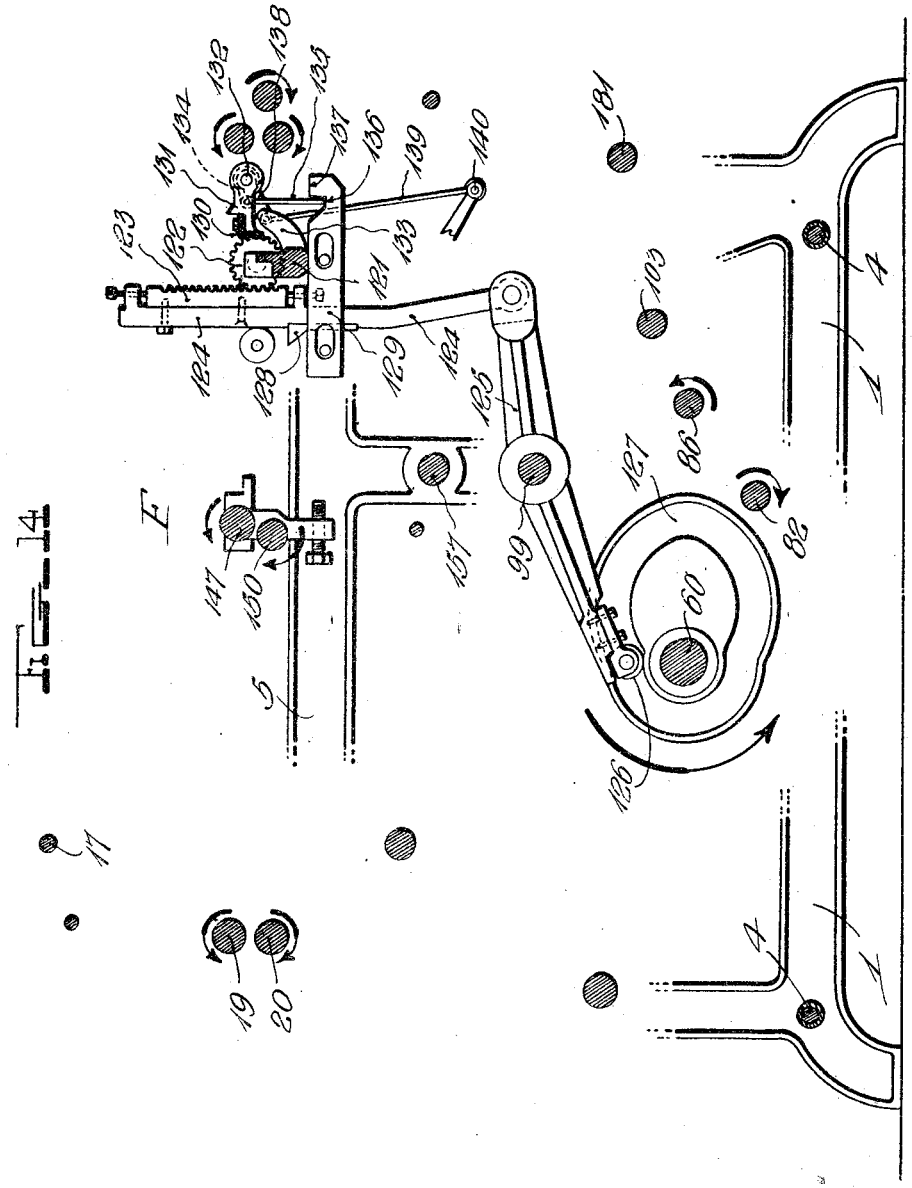

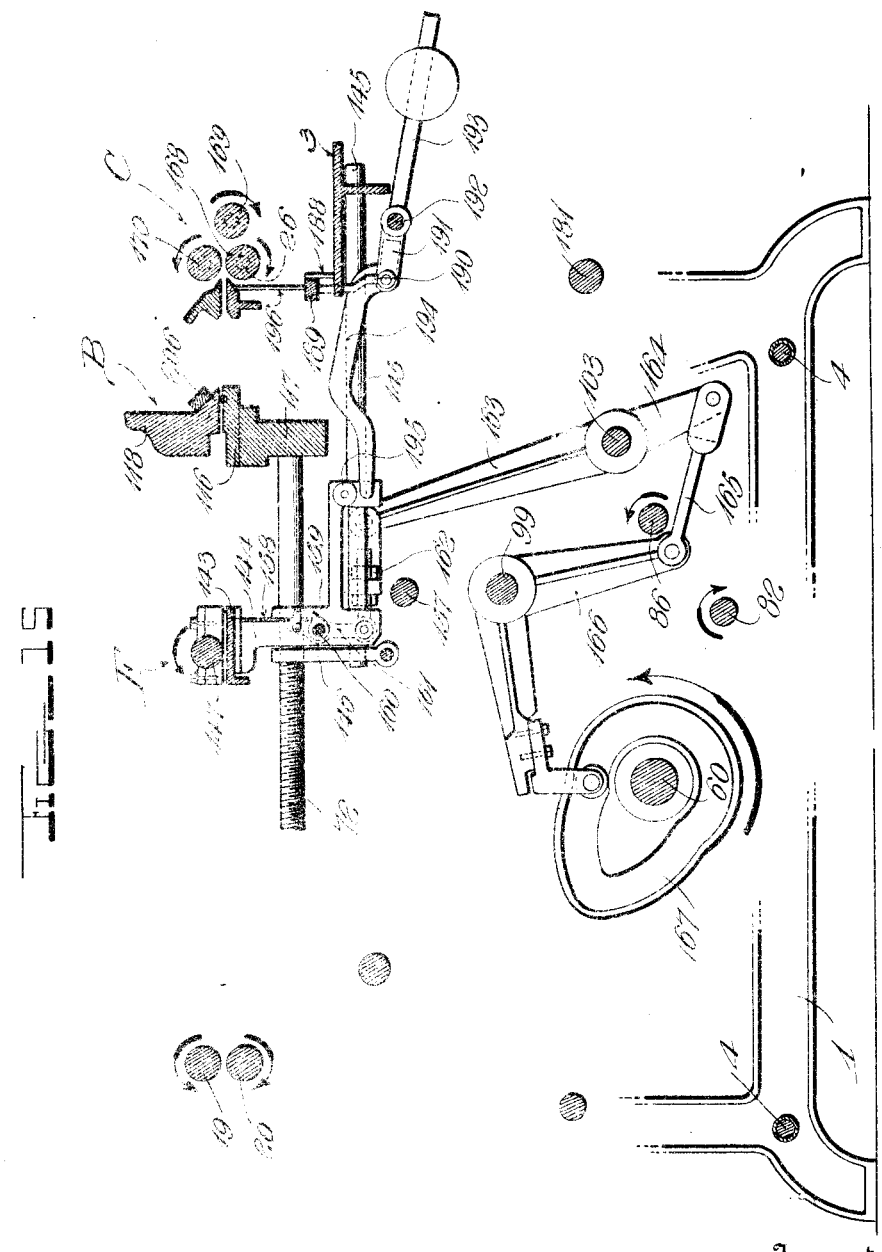

Patented Aug. 18, 1925.

1,550,587

UNITED STATES PATENT OFFICE.

LONZO BAXTER SMITH, OF RICHWOOD, WEST VIRGINIA, ASSIGNOR OF FOUR TWENTY-FIFTHS EACH TO T. L. FALOR, W. L. THOMAS, AND J. A. TINCHER, ALL OF RICHWOOD, WEST VIRGINIA.

STOVEPIPE-MAKING MACHINE.

Application filed December 11, 1922. Serial No. 606,221.

*To all whom it may concern:*

Be it known that I, LONZO BAXTER SMITH, a citizen of the United States, residing at Richwood, in the county of Nicholas and State of West Virginia, have invented certain new and useful Improvements in Stovepipe-Making Machines; and I do declare the following to be a full, clear, and exact description of the invention, such as will enable others skilled in the art to which it appertains to make and use the same.

My invention relates to machines for making complete sections of stove pipe, with the exception that the side seam is left open to permit nesting of a plurality of sections for shipment and storage.

While the primary object of the invention is to provide an effective and rapid machine for constructing pipe sections of the form shown by my United States Patent No. 1,356,022 of October 19, 1920, it is to be understood that the machine is not restricted to the making of this particular form of pipe section.

A further object is to provide in a single machine, means for intermittently advancing a long sheet of metal, means for cutting a blank from the sheet after each advancement thereof, means for edge bending the blank to later form the side seam of the pipe section, and means for curving the bent blank on an axis parallel to its bent edge, forming a complete split section of pipe whose side seam can be easily completed later by hand.

Other objects are to make novel provision for ejecting any remnant of any sheet which is a trifle too small for a complete pipe section, and to further provide for ejecting any narrow strip which may be left after shearing the last blank therefrom.

Yet another object is to provide for relative adjustments of the several units of the machine to adapt the latter for making pipe sections of different diameters.

A still further aim is to provide novel means, controlled by the sheet of metal fed to the machine, for bringing the several metal feeding and working units into play in the proper sequence.

One metal working unit is provided with a gage for limiting the movement of the metal and another object is to provide for moving this gage out of the path of the metal to allow it to advance to the next unit.

The master control for the entire machine is preferably located in the path of the metal adjacent the above mentioned gage and it is one of my objects to provide connecting means between said master control and said gage, whereby the former is moved by the latter out of the path of the metal.

Still further aims are to construct the individual units of the machine in such a manner that they will be well adapted to the purposes for which they are designed.

With the foregoing in view, the invention resides in the novel subject matter hereinafter described and claimed, the description being supplemented by the accompanying drawings.

Figures 1 and 1ª jointly show a longitudinal sectional view of a machine constructed in accordance with my invention.

Fig. 2 is an enlarged vertical longitudinal section through the shear S and the scrap-ejector E associated therewith.

Fig. 3 is a vertical longitudinal sectional view through the retrograde feeder F' for ejecting undersize remnants of metal.

Fig. 4 is a detail transverse section as indicated by line 4—4 of Fig. 3.

Figs. 5 and 6 are side elevations of opposite sides of the machine, parts being omitted from each view for sake of clearness.

Fig. 7 is a top plan view with parts omitted.

Figs. 8 and 9 are elevations of the inlet and outlet ends of the machine.

Fig. 10 is a horizontal section with parts in elevation.

Fig. 11 is a diagrammatic longitudinal section showing more particularly the clutch of the entire machine and the controlling means thereof, as well as portions of the operating means of the feeder F.

Fig. 12 is a diagrammatic view showing the shear operating means, the operating mechanism for the curver C and part of the operating means for the feeder F.

Fig. 13 is a diagrammatic longitudinal section showing the operating mechanism for the movable clamping member of the bender B.

Fig. 14 is a diagrammatic longitudinal section showing the operating mechanism for the upwardly swinging bending member of the bender B.

Fig. 15 is a diagrammatic view illustrating parts of the operating means of the feeder F and associated parts.

Figure 16 is a plan view of the blank after it is sheared, punched at its edges with edge connecting means, and bent at one edge in Z-shape.

Figure 17 is an edge elevation of the blank shown in Fig. 16.

Figure 18 is an enlarged detail sectional view illustrating the manner in which the edges of the blank are connected with each other after said blank is curved into cylindrical form, forming a complete stove pipe section.

In the drawings above briefly described, I have illustrated a main frame for supporting all parts of the machine, said frame being composed of a pair of parallel side frames 1 connected at their upper corners by end bars 2 and 3, while lower portions of said frames are held in spaced relation by suitable tie rods and spacers, as indicated by the numerals 4.

Mounted upon the main frame, are means for intermittently advancing an elongated sheet of metal, a shear S for cutting a blank from the sheet after each advancement thereof, a feeder F, a bender B for making a seam-forming bend on one edge of the blank, a curver C to which the bent blank is fed by the aforesaid feeder, for curving said blank into substantially pipe-form on an axis parallel with its bent edge, a retrograde feeder F' for ejecting any remnant of the sheet which is of slightly insufficient size to form a complete blank and a scrap ejector E which ejects any small strip of metal which may remain after the last shearing operation is performed.

The shear S is adjustable along the horizontal top bars 5 of the side frames 1, being provided with a pair of slides 6 to which are secured the ends of the transverse shear bed 7. A pair of standards 8 rise from the slides 6 and are provided with appropriate guide-ways for a vertically movable shear member 9 which may be laterally adjusted in its guides by suitable set screws 10. The shear member 9 carries a sheet cutting blade 11 and a pair of dies 12 and 13 disposed at opposite sides of said blade. The blade 11 co-acts with a stationary blade 14 carried by the bed 7, while the dies 12 and 13 co-act with recessed die blocks 15 and 16 carried by said bed.

By this arrangement, when a sheet of metal is fed between the blades 11 and 14 and the shear member 9 is operated, a blank will be cut from the advanced end of the sheet and simultaneously, the dies 12 and 13 will stamp the metal at opposite sides of the cut with edge connecting means such as those disclosed by the patent above referred to.

In the preferred form of construction, a horizontal transverse shaft 17 connects the upper ends of the standards 8 and a pair of arms 18 are pivotally mounted at their upper ends upon this shaft, the lower portions of said arms being disposed in advance of the shear mechanism S, these arms being utilized in addition to other purposes, for carrying an upper feed roll 19 and a lower presser roll 20 (see more particularly Figs. 1 and 2). The roll 19 is provided with a sprocket wheel 21 meshing with a chain 22 at one side of the machine (see Fig. 6). This chain preferably runs throughout the greater part of the length of the main frame and is trained around a pair of sprockets 23 and 24, the former being idle, while the sprocket 24 has a clutch connection 25 with a transverse shaft 26 which forms an element of the curver C, this shaft 26 being driven by a chain 27 from a shaft yet to be described. The upper reach of chain 22 is held in mesh with the sprocket 21 by an idler 28 carried by one of the slides 6. It will thus be seen that as long as the chain 22 is driven, the upper feed roll 19 will be rotated in a direction to feed the sheet of metal to the machine. However, at certain times, the lower presser roll 20 is spaced downwardly to such an extent that it does not hold the sheet against the upper feed roll 19 and hence no feeding of the sheet will then take place. In the preferred form of construction, the ends of the presser roll 20 are reduced and passed through slots 29 in the lower ends of the arms 18, said ends of the presser roll being rotatably supported by a pair of horizontal levers 30 which are shown most clearly in Fig. 2. At one of their ends, these levers rest and fulcrum upon noses 31 on the lower ends of a pair of rigid arms 32, which depend from and move bodily with the shear member 9. The other ends of the levers 30 are provided with vertical links 33 which pass loosely through openings in a pair of perches 33' extending from the lower end portions of the arms 18. Suitable brackets 34 are secured upon these perches and a pair of cam levers 35 are fulcrumed at 36 to said brackets, said levers 35 having appropriate connections 37 with the links 33. A pair of upstanding arms 38 on a transverse control shaft 39, co-act with the ends of the levers 35 as will be clear by reference to Fig. 2, this shaft 39 being provided with a suitable number of control fingers 40 which are normally held in the position shown in the drawings (Fig. 2) by the sheet of material in the machine. When the fingers 40 are so held, the arms 38, levers 35 and links 33, so move the levers 30 as to raise the presser roll 20 and force the sheet of metal against the feed roll 19 so as to feed the sheet through the machine. It will be observed however that in view of the fact that the levers 30 are fulcrumed upon the noses 31 of the arms 32 which move with the shear member 9, these levers 30 and presser roll 20 carried thereby, will immediately disengage the sheet from the feed roll 19 when said shear member 9 starts downwardly on its working stroke. When the fingers 40 are released by the end of the sheet which has been intermittently advanced through the machine, said fingers fly upwardly under the action of an operating spring or springs 41 (Fig. 2) thereby rocking the shaft 39 to disengage the arms 38 from the levers 35 and at the same time permitting the scrap-ejecting means 42 to come into play, it being of course understood that when the levers 35 were released, the levers 30 dropped and permitted the presser roll 20 to disengage the sheet or rather the remaining scrap thereof, from the feed roll 19. This scrap-ejector 42 will be hereinafter described in detail.

The numerals 42 designate rigid sheet-guiding fingers carried by a transverse bar 43 which is secured at its ends to the brackets 24, said fingers 42 being staggered with respect to the fingers 40 so as to permit the latter to move upwardly under the influence of the spring 41. The fingers 42 preferably terminate in flat springs 44 spaced a slight distance above guide fingers 45 on a shaft 46 which extends between the lower ends of the arms 18, said springs 44 and fingers 45 serving to properly guide the advancing sheet over the blade 14 and under the stripper 47 which prevents raising of the cut blank, when the shear member 9 ascends. The fingers 45 and shaft 46 are mounted in any suitable manner to permit them to yield downwardly under the shearing operation, after which they return to the position shown in Fig. 2.

For operating the movable shear member 9, a pair of adjustable links 48 depend therefrom at the sides of the machine to a pair of crank arms 49 on a transverse rock shaft 50, this shaft being mounted in appropriate bearings 51 which are secured to the slides 6 on the side frames 1. Shaft 50 is provided with a depending crank arm 52 which is pivoted at its lower end to a longitudinal operating bar 53, by means of a bolt 54 which may be passed through any one of a plurality of openings 55 in said bar 53, according to the position on the frame, to which the slides 6 have been adjusted. The bar 53 is pivoted to a T-shaped lever 56 fulcrumed on a transverse shaft 57 at one end of the main frame, as shown more particularly in Figs. 1 and 2. One arm of the lever 56 is provided with a roller 58 co-acting with a cam 59 on a main cam shaft 60 which extends between the lower portions of the side frames 1 and fixedly carries all cams for operating the entire machine. Another arm of the lever 56 is suitably shaped as indicated at 61 for permitting a hand lever to be attached thereto for operating the press by hand is desired, for instance to shear and stamp the extreme forward edge of the sheet when it is being initially inserted into the machine. The feeding means may then also be operated by hand, for which purpose I have shown the roller 19 provided with a hand wheel 62.

As the retrograde feeder F' is mounted to be bodily adjusted with the shear S, as well as for adjustment toward and from the shear, the mounting means of this retrograde feeder may now be described. A pair of horizontal bars 63 are rigidly secured at one end to the bed 7 of the shear S and extend therefrom over the end bar 2 and these bars 63 support a plurality of posts 64 upon which a pair of parallel longitudinal tracks 65 are rigidly mounted. A pair of carriers 66, rigidly connected by transverse bars 67, carry the retrograde feeder F' and are adjustable along the tracks 65, appropriate clamping screws 68 being employed for securing said carriers in adjusted positions. The bars 63 are rigidly connected at their outer ends by a transverse bar 69 to which a longitudinal adjusting screw 70 is swiveled, said screw being threaded through a nut 77 carried by the end bar 2. It will be seen that turning of the screw 70 will longitudinally adjust the entire shear mechanism S, the retrograde feeder F', and a supplemental frame which carries this feeder including the tracks 65 and the bars 63. Then, further adjustment of the carriers 66 may be made along the tracks 65 if necessary. To lock the shear S and associated parts in the positions to which they have been adjusted, I provide a pair of longitudinal threaded rods 72 which are rigidly held by the main frame of the machine. The bed 7 of the shear is formed with openings receiving the rods 72 so that said bed may slide along the rods when the shear is adjusted along its frame. Then, lock nuts 73 on the rods 72, are threaded up against opposite sides of the bed 7, so that the latter is securely locked.

Before passing on to some other part of the machine, it may be pointed out that the connecting bars 67 between the carriers 66 carry appropriate guide fingers for the sheet of metal, as indicated by the numerals 74, 75 and 76, the latter having inclined portions for a purpose to appear. These fingers 76 aline with longitudinal sheet supports 77 which are in turn alined with the fingers 40 when the latter are depressed to the position shown in the drawings. Any suitable means such as transverse bars 78 carried by the inner portions of the tracks 65, may be employed for mounting the supports 77. When the carriers 66 are adjusted along the tracks 65, the bars 78 and supports 77 may be similarly adjusted to center them between the mechanisms F' and S, by any desired provision made for that purpose.

As the retrograde feeder F' does not operate until all of the other operations of the machine have been performed, it seems advisable to describe this feature as well as the scrap-ejector E, after describing the other units of the machine. It is believed that a better understanding of the other units may be had by first describing the means for driving the cam shaft 60 at the proper time. Hence, this will be done. See Figs. 1 and 10 more particularly.

On the shaft 60 which, as above stated, fixedly carries all of the cams for operating the machine, a clutch housing 80 is rotatable, being provided with teeth meshing with a pinion 81 on a transverse shaft 82 having a sprocket 83 which drives the chain 27 above referred to. The shaft 82 is driven by intermeshing gears 84 and 85 (Fig. 10) from a main drive shaft 86 which is parallel with shaft 82 and is provided with a sprocket 87. A sprocket chain 88 is trained around this sprocket and around a smaller sprocket 89 at one of the upper corners of the machine, the sprocket 89 being driven by a larger sprocket 90 and a sprocket chain 91 from an electric motor 92 or other suitable prime mover. Thus, the housing 80 is continually rotating upon the shaft 60 and the chain 22 is continually driven to operate the several feed rolls of the machine, but only at a predetermined time is the housing 80 operatively connected with the cam shaft 60 to rotate the latter. This housing is provided with internal teeth 93 co-operable with a pair of spring pressed dogs 94 on a disk 95 which is secured to the shaft 60 for rotation therewith. A control lever 96 is loose upon the shaft 60 and is provided with cams 97 which normally engage the dogs 94 and hold them out of engagement with the teeth 93, the control lever 96 being then held in the position disclosed in Fig. 11. For so holding the lever 96, I provide a movable abutment which is preferably in the form of a lever 98 loose upon a transverse shaft 99, said lever preferably having a yieldable shoe 100 to engage the lever 96. This lever 98 is normally held in the position disclosed in Fig. 11 by an upstanding dog 101 whose lower end is secured upon a sleeve 102 which is free to turn upon a transverse shaft 103. See Figs. 1 and 11. Sleeve 102 is provided with an arm 104 co-operable with a suitable spring 105 to yieldably retain the dog 101 in operative position. The sleeve 102 is also provided with a pair of upstanding control arms 106 whose upper ends carry transverse shafts 107 and 108 which are disposed one above the other. A pair of master control fingers 109 are secured to and rise from the rock shaft 107, the upper ends of these fingers being in the path of the blank cut from the sheet by the shear S. Latches 110 secured on the lower rock shaft 108 normally engage the lower ends of the fingers 109 so that they are held against swinging upon their own pivots. Thus, the blank advanced through the machine will strike the upper ends of the fingers 109 and will consequently swing the arms 106 to release the dog 101. This releases the lever 98 which in turn releases the control lever 96 of the clutch, thereby permitting the dogs 94 to establish a driving connection between the clutch shaft 80 and the cam shaft 60.

Means are provided for releasing the latches 110 when the clutch has been thrown into play, permitting said fingers to move out of the path of the advancing blank. However, this releasing means can be more clearly understood if described later.

For restoring the lever 98 to operative position and permitting the dog 101 to again engage said lever under the influence of the spring 105, I pass one end of a resetting rod 111 loosely through an ear on said lever and provide said rod with a nut or other shoulder 112 to strike and reset the lever when said rod is pulled. For so pulling the rod, attention now being directed more particularly to Figs. 1 and 11, a bell crank 113 is loosely fulcrumed upon the shaft 57 and is connected at one end with said rod while its other end is provided with a roller 114 which co-acts with a cam 115 on the shaft 60. At the proper time, the cam rocks the bell crank 113 and pulls upon the rod 111 to restore the lever 98 to its operative position with its cushion 100 in the path of the projecting end of the control lever 96. Then, the rod 111 is moved so that the shoulder 112 is disengaged from the lever 98, leaving the latter free to release when the dog 101 is next tripped.

The releasing means for the latches 110 is directly associated with the bender B and by now describing this bender, a more thorough understanding of certain parts above referred to, may be gained. This bender includes a suitable bed plate 116 which may well be secured upon a transverse bar 117 which supports one end of the rods 72. Over the bed plate 116, a sheet-clamping and die-carrying member 118 is mounted, this member being provided with an acute angular die 119 around which the edge of the metal blank cut from the sheet by the shear S, is intended to be bent. Member 118 also carries another die 120 related with the die 119 in such a manner that the pivoted upwardly swinging bending member 121, will turn the edge of the sheet around the die 119 and against the die 120 to form a Z-bend. This bend is later flattened by movement of the member 118 but said bend is left sufficiently open to permit the opposite edge of the blank to be inserted therein in the manner disclosed by Patent No. 1,356,022.

For swinging the bending member 121 upwardly, I have provided its ends with pinions 122 which mesh with vertical rack bars 123 carried by upright operating bars 124 suitably guided at the sides of the machine, the lower ends of said bars 124 being pivoted to a pair of levers 125 having rollers 126 engaging cams 127 on the ends of the cam shaft 60.

It may here be explained that the bars 124 are provided with cams 128 for horizontally moving a pair of slides 129 in one direction, when said bars move downwardly to swing the bending member 121 upwardly to operative position. The function of these slides will be described more fully below.

The numeral 130 designates a gage bar slightly beyond the upper ends of the master control fingers 109, serving to limit the movement of the sheet of metal when said fingers have been operated to bring the clutch into play, in the manner above set forth, thereby also causing the bending member 121 to swing upwardly. This gage bar is carried by arms 131 which extend from a rock shaft 132 extending across the machine between the bender B and the curver C. Upward movement of the bending member 121, causes noses 133 with which it is provided, to swing the arms 131 and the gage bar 130 upwardly out of the path of the metal sheet or blank and it is then that the slides 129 come into play to hold the gage bar in its raised position. The shaft 132 which carries the gage bar in question, is provided with crank arms 134 from which upright pins or rods 135 depend, the lower ends of said rods being normally received in notches 136 in the slides 129 as shown in Fig. 14. When the gage bar 130 is raised by the fingers 133 however, the rods 135 leave the notches 136 and by the time the bending member 121 and its noses 133 again move downwardly, the slides 129 have been shifted by the cams 128 so that the rods 135 then rest upon the slides 129, at the points identified in the drawings at 137, thereby holding the gage bar 130 raised out of the path of the advancing sheet.

It is the upward movement of the gage bar 130 that releases the latches 110, thereby permitting them also to move out of the path of the sheet metal. In attaining this result, I provide the rock shaft 132 with a pair of additional crank arms 138 from which a pair of links 139 depend, the lower ends of these links carrying a transverse rod 140 having connection with the latches 110 (see Figs. 1ª and 11). By this association of parts, it will be seen that when the gage bar 130 is raised out of the path of the sheet metal, the links 139, rods 140 and associated parts which connect the gage bar with the latches 110, will release the latter, thereby permitting the fingers 109 to move out of the path of the advancing sheet metal. Preferably, the fingers 109 are not only permitted to move out of the path of the metal, but are forced to move in this manner by the pin and slot connections 141 which are provided between the lower ends of the fingers 109 and crank arms 142 which are moved by operation of the latches 110.

Due to the arrangement above described, it will be seen that the slides 129 jointly hold the gage bar 130 and the fingers 109 out of the path of the advancing sheet metal. It is then that the feeder F comes into play to advance the blank which has been cut from the sheet by the shear S and bent by the bender B, to engage this blank with the curver C. To accomplish this result, the feeder is of novel construction. The numeral 143 designates a bed plate over which the metal blank is guided by suitable supports, said bed plate being secured to a pair of carriers 144 which are by preference of the form shown most clearly in Figs. 1ª and 15. These carriers slide upon a pair of horizontal rods 145 which may be well supported at one end by hangers 146 from the threaded rods 72. Above the bed plate 143, the carriers 144 support a feed roll 147 having a sprocket 148 held in mesh with the upper reach of the chain 22 by a suitable idler 149. A presser roll 150 for the reception of which the plate 143 is suitable recessed, is carried by arms 151 which extend from a rock shaft 152 mounted at its ends upon the carriers 144. This rock shaft is provided with an actuating arm 153 co-operable with a bell crank 154 controlled by a nose 155 (Fig. 11) on a cam 156 on shaft 60, said bell crank being loosely mounted on a transverse shaft 157 located above shaft 99. Prior to operation of the cam shaft 60 by the clutch, the rollers 147 and 150 have co-acted in feeding the sheet forwardly. As soon as the cam shaft is operated however, the nose 155 releases lever 154 and thus the presser roll 150 disengages the sheet from the roller 147 so that the latter is thrown out of play. While this is taking place, the sheet is being sheared by the shear S and bent by the bender B, and when the gage 130 and the fingers 109 are held out of the path of the bent and sheared blank, the feeder F comes into play to advance said blank to the curver C, for which purpose I provide the carriers 144 of said feeder with a pair of blank grippers 158 which pass slidably through the bed plate 143 and are supported at their lower ends upon cams 159 on a rock shaft 160 which extends between the carriers 144 (Fig. 15). The shaft 160 is provided with depending operating arms 161 connected by adjustable connections 162 to the upper ends of levers 163 secured on the shaft 103. This shaft is provided with a depending crank arm 164 connected by a link 165 to a bell crank 166 which is fulcrumed on the shaft 99 and is operated by means of a cam 167 on the shaft 60. By this arrangement, when the cam 167 is turned, the levers 163 are operated to move the carriers 144 and in fact the entire feeder F along the frame, after first rocking the shaft 160 and causing the arms 159 to force the grippers 158 upwardly so as to grip the blank cut by the shear and bent by the bender B, thereby advancing said blank to the curver C.

The curver C (see more particularly Figs. 1ª and 12) includes three rollers 168, 169 and 170 all mounted between appropriate bearings 171 carried by the side frames of the machine. The roller 168 is carried by the shaft 26 which is driven by the chain 27 above described, the roller 170 is driven by gearing 170ª and the roller 169 which is driven by means yet to be described, can be adjusted toward and away from the other rollers by means of a pair of adjusting screws 172, said screws preferably having sprocket wheels 173 connected by a sprocket chain 174 which extends across the machine. For driving this roller 169, I provide one end of its shaft with a gear 175 meshing with another gear 176 on a short transverse shaft 177 at one side of the machine, said shaft 177 being driven by a chain 178 and suitable sprockets, from the shaft 86. The top roller 170 is carried by the upper ends of a pair of pull rods 179 whose lower ends have adjustable connections with crank arms 180 on a transverse rock shaft 181 which is located beneath the end bar 3. This shaft is provided with a depending crank arm 182 connected by a rod 183 with a bell crank 184 which is controlled by a cam 185 on the shaft 60. It thus follows that by the time the cut and bent blank has been advanced by the feeder F sufficiently to move its Z-bend beyond the rollers 168 and 170, the cam 185 comes into play to rock the shaft 181, thereby pulling upon the rods 179 and lowering the roller 170 into contact with the blank. Thus, this blank is held against the rollers 168 and 169, so that it is carried through the curver and curved to proper shape by said rollers.

Means are provided to hold the rods 179 in its lowered operative position until the blank has passed through the curving means. In the present showing, I provide the shaft 181 with a rigid upstanding holding arm 186 having a latch 187 at its upper end for co-action with a stop 188 which passes slidably through an opening in the cross bar 3. By the means described below, the stop 188 is moved downwardly for engagement with the latch 187 to hold the arm 186 in such a position that the roller 170 will remain in its lowered operative position. In the present showing, the stop 188 is carried by a depressible transverse bar 189 which is spaced above the bar 3, said bar 189 being carried by the upper ends of a pair of rods 190 which rise from crank arms 191 of a transverse rock shaft 192 located under the bar 3, this shaft being provided with weighted arms 193 which tend to rock it in a manner to normally raise the bar 189 and the stop 188. The arms 191 of the shaft 192 however are provided with laterally extending cam arms 194 in the paths of rollers 195 carried by the carriers 144 of the feeder F. Thus, when this feeder has advanced the blank to the curver C and the cam 185 has been operated to depress the roller 170 to operative position, the movement of the carriers 144 has caused the rollers 195 to strike the arms 194 downwardly, thereby depressing bar 189 and the stop 188 to be engaged by the latch 187 of the arm 186, which arm swings to the right when shaft 181 operates to depress the roller 170. I provide means to hold the stop 188 in operative relation with the latch 187 even after the feeder F has returned to its normal position, this means preferably consisting of upright feelers 196 which rise from the bar 189. The downward movement of this bar moves the feelers out of the path of the advancing blank and when the feeder returns and releases the arms 194, the feelers engage the blank and do not permit the bar 189 to raise under the action of the weighted arms 193 until the blank has passed said feelers and the curving operation has been completed. The stop 188 immediately rises with the bar 189, releasing the arm 186 which assumes its normal position under the influence of a spring 197 acting on a crank arm 198 with which shaft 181 is provided.

It has been before stated that the clamping member 118 was operative to flatten the Z-bend made at the edge of the metal blank by the bender B. Means for operating the clamping member in this manner, which means are detailed in Figs. 10 and 13, will now be described. This member 118 is carried by the upper ends of a pair of upright arms 199, whose lower ends are pivoted to substantially horizontal levers 200 which are fulcrumed upon the shaft 99 above referred to, cams 201 on the shaft 60 being provided for operating said levers 200. By means of links 202, the intermediate portions of the arms 199 are connected with the upper ends of the adjustable crank arms 202 which are carried rigidly by the rock shaft 103. This rock shaft is provided with a crank arm 204 co-operable with a cam 205 on the shaft 60. By the time the metal blank has been received between the bed plate 116 and the clamping member 118, and has struck the gage 130, the cams 201 have come into operation to actuate the levers 200, thereby pulling downwardly upon the arms 199 and tightly clamping the blank between the clamping member 118 and said bed plate 116. This operation also forces the blank against the swaging key 206 carried by the bed plate 116 so that a longitudinal stiffening rib is formed throughout a portion of the width of the blank, to later extend longitudinally of the pipe section. By the time this clamping operation has been completed, the bending member 121 swings upwardly to form the Z-bend at the edge of the blank. Then, the cams 205, levers 204, crank arms 203 and links 202 come into play to withdraw the die 119 of the clamping member 118 from the Z-bend. Then, through the action of the levers 200 and their operating cams, the arms 199 are raised so that member 118 is above the Z-bend. This member is then advanced by action of the links 202 and associated parts so that it is directly over the Z-bend. Then, the levers 200 are again operated by their cams to cause the clamping member 118 to descend, thereby substantially flattening the Z-bent edge of the blank. Member 118 is then returned to its normal position, the feeder F grips the blank and advances it to the curver C and this curver is then brought into operation.

Having described the feeding means for the sheet and the blank which is cut therefrom, each time the sheet is advanced, as well as the construction of the shearing and stamping means S, the bender B, and the curver C, we may well consider the retrograde feeder F' which is most clearly disclosed in Figs. 1 and 3. It will be recalled that this feeder is for the purpose of ejecting any remnant of the sheet which may be a trifle too small to form a complete stove pipe section. In providing an arrangement which will effectively operate for this purpose, I make use of a very novel association of parts. A feed roller 207 is mounted between the carriers 66 to engage the upper side of a sheet fed to the machine, one end of this roller being provided with a bevel pinion 208 shown only in Fig. 5, while the general structure of the retrograde feeder F' is detailed more particularly in Fig. 1. The gear 208 meshes with a similar gear 209 which is slidably keyed upon a longitudinal shaft 210 driven by bevel gearing 211 from the shaft of the feed roll 19 of the shear S. The arrangement is such that the roll 207 rotates in the reverse direction from the roll 19. A presser roll 212 is positioned below the feed roll 207 and is carried by a pair of levers 213 which are fulcrumed on the carriers 66. A transverse actuating shaft 214 is mounted on these carriers and is provided at its ends with cams 215 for operating the levers 213 to raise the presser roll 212, thereby bringing the sheet remnant in contact with the retrogradely rotating roll 207. The shaft 214 is provided with control fingers 216 which are normally held down by the sheet of metal in the machine, but when the end of this sheet passes the fingers, they are released so that the actuating shaft 214 may at a later time move under the influence of an operating spring 217 (Fig. 3) with which it is provided so as to cause the cams 215 and levers 213 to bring the rolls 207 and 212 into play. Movement of the shaft under the influence of this spring however when the fingers 216 are first released, is prevented by a second control arm 218 on one end of shaft 214. The end of this arm carries a spring-pressed latch 219 (Figs. 3 and 4) which normally engages the lower side of the longitudinal stop bar 220 having two flanges 221 and 222. At spaced points, the bar 220 is provided with pairs of notches through which the latch 219 may pass when said notches are moved to a proper position by movement of the bar 222. Each pair of notches consists of a lower notch 223 in the flange 221 and an upper notch 224 in the flange 222, the two notches being out of vertical alinement with each other. The bar 220 is connected with the operating means of the shear S and said bar moves toward said shear when the movable shear member 9 is pulled downwardly. Upon this movement, one of the lower notches 223 is alined with the latch 219 and if the fingers 216 have then been released by the end of the sheet, spring 217 turns rock shaft 214 until the latch 219 moves upwardly through said notch 223. The latch then strikes the upper flange 220 however so that it is still held against further movement, preventing the shaft 214 from bringing the rollers 207 and 212 into play at this time. By the time the shear S has completed its operation however and returns towards its raised position, the stop bar 220 moves away from said shear and thus the next adjacent upper notch 224 is brought into alinement with the latch 219. This permits the latch to pass through the notch 224 allowing the shaft 214 to turn to the maximum under the action of the spring 217. By this means, the cams 215 operate the levers 213, bringing the presser roll 212 upwardly, thereby binding the remnant of the sheet between the two rolls, with the result that this remnant will be retrogradely fed down the inclined guides 76 and entirely ejected from the machine. When the next sheet is fed to the machine, it forces the control fingers 216 again downwardly and the latch 219 merely snaps by the bar 220 so that it again engages the lower flange of this bar.

For operating the stop bar 220, I fulcrum an upright lever 225 on one of the tracks 65 and connect the lower end of this lever by the rod 226 with a short crank arm 227 on the operating shaft 50 of the shear S.

The scrap ejecting means E will now be described. This means includes a pair of arms 228 secured upon the ends of a sleeve 229 which is rotatable on a shaft 229' extending between the upper end portions of the arms 18 in parallel relation with the shaft 17. The lower ends of these arms carry ejecting fingers 230 which are pivoted thereto and may move between the rolls 19 and 20, one of which is preferably grooved for their reception. Means are provided whereby if any scrap of metal which remains from the sheet after the last shearing operation, releases the fingers 40, the arms 228 will operate after the last operation of the shear member 9, to engage the fingers 230 with the inner edge of the piece of scrap metal, to withdraw it beneath the fingers 40 which are then raised and deposit said scrap upon the rods 72. The fingers 230 are normally held up by a rod 231 which extends between the ends of arms 232 which rise from the ends of the shaft 39, but when this shaft is released by the fingers 40 and is turned under the action of the spring 41, the arms 38 release the levers 35 which control the presser roll 20 and at the same time, the fingers 230 and arms 232 are freed so that they may operate.

The sleeve 229 above mentioned is provided with a crank arm 233 connected by a link 234 to an actuating arm 235 which is loosely mounted on the shaft 17. Slidably carried by the movable shear member 9 and movable downwardly against the compression of a spring 236, is a rod 237 which is in the downward path of arm 235. Means are provided, in the form of a dog 238 carried by the member 9 and a nose 239 on the arm 235, for causing the last upward stroke of said member 9, to swing the arm 235 downwardly, thereby causing the several operating connections to swing the arms 228 inwardly and engage the fingers 230 with the piece of scrap metal. At the same time, the rod 237 is forced downwardly and spring 236 is put under compression. By this time, a second nose 240 on the arm 235 strikes the set-screw 241 on the dog 238 and thereby disengages this dog from the nose 239. The spring 236 then comes into play to quickly force the arms 235 upwardly, causing the arms 228 and fingers 230 to withdraw the piece of scrap.

It may be here explained that engagement of the dog 238 with nose 239 is not permitted until the last shearing operation is being performed, an abutment 242 being provided to engage a pin 243 on said dog for this purpose. This abutment is vertically elongated to permit the vertical movement of the shear member 9 and in the present showing is carried by a link 244 connected with an ear 245 on the arm 233. Thus, when the rod 231 is released from the fingers 230 and the arms 228 by the fingers 40 and shaft 39, a slight drop of said arms and fingers takes place which is sufficient to pull upon the rod 244 and move the abutment 242 out of operative relation with the pin 243. This takes place on the downward movement of the shear member 9, with the result that the next upward movement thereof will find the dog 238 engaged with the nose 239, swinging arm 235 downwardly to move the arms and fingers 228 and 230 and compress the spring 236, as above described.

*Operation.*

A sheet of metal is fed between the guides 74 and 75 by hand and it will be seen that it strikes the control fingers 216, thereby moving them downwardly to rock the shaft 214, causing it to release the retrograde feed rollers 207 so that they cannot immediately act upon the sheet of metal, and at the same time causing the latch 219 to snap under the stop bar 220. Either before or after advancing the sheet this far, the clutch 25 is preferably thrown out and the hand wheel 6x may be used to turn the roller 19 when the sheet is advanced far enough to be reached by said roller. In moving to this point, the fingers 40 are depressed and the rock shaft 39 and associated parts causes the levers 30 to raise the presser roll 20 to clamp the sheet in contact with said roller. Thus, by turning this roller by hand until the end of the sheet is positioned in the shear S, it will be seen that this shear may be hand-operated by placing a hand lever on the projecting end 61 of lever 58. Thus, the end of the sheet may be trimmed and the dies 12 caused to operate thereon. The clutch 25 may then be operated so that chain 22 is driven, thereby rotating the feed rolls 19 and 147 by power, so that the sheet advances through the machine until it strikes the master control fingers 109 and the stop bar 120. When this takes place, the clutch housing 60 is automatically connected operatively with the cam shaft 60 in the manner before described in detail, the result being that the cam nose 155 immediately releases lever 134 and releases the feed roll 147 out of operative engagement with the sheet by moving roll 147 downwardly. At the same time, the cam 64 operates the movable shear member 9, thereby simultaneously cutting a blank from the sheet, stamping one edge of the blank with the dies 13, and stamping the adjacent edge of the sheet with the dies 12. Simultaneously with this operation, the clamping member 118 is brought down upon the blank to swage the same by means of the key 206, said member 118 being operated by the cam 201 in the manner above explained. This having been done, the bars 124 are moved downwardly by the cams 127, thereby swinging the bending member 121 upwardly to Z-bend the edge of the blank. This upward swinging of the bending member 121 raises the gage bar 130 out of the path of the blank and this gage releases the latches 110 from the control fingers 109, as well as moving these fingers to a position at which they will not interfere with advancement of the blank. By this time, the slides 129 have moved to an operative position to temporarily prevent return of the gage bar 130 and the fingers 109 to their normal positions. By the means above described, the clamping member 118 now flattens the Z-bend and when this has been done, the feeder F grips the blank and starts toward the bender B, thereby advancing the blank toward the curver C. During this movement, the carriers 144 swing the cam arms 194 downwardly, thereby moving the feelers 196 out of the path of the blank and permitting the bent edge of this blank to pass beyond the rollers 168 and 170. While moving in this manner, the carriers strike the slides 129 and return them to their normal positions, so that when the blank finally passes, the gage 130 and the control fingers 109 may move to their operative positions, a suitable weight W being connected with said fingers for this purpose. By the time the bent edge of the blank has passed slightly beyond the rollers 168 and 170, the upper roller 170 has been lowered into contact with the blank and is held in this position by the arm 186 which is now engaged with the stop 188. Thus, the driven rollers of the curver C will feed the blank through this curver, it being of course understood that by this time, the feeder F has released its grip upon the blank and is returning to its normal position. During this return movement, the feeder of course releases the arms 194, but as the feelers 196 are then in contact with the lower side of the blank, the stop 188 cannot raise and release the holding arm 186. Thus, the complete curving operation of the blank is completed by the several rollers and when the end of this blank passes the feelers 196, the bar 189 is raised under the action of the weighted arms 193, thereby disengaging the stop 188 from the latch 187 of the holding arm 186 and permitting the latter to return to its normal position under the influence of the spring 197.

By the time the operations just described have taken place, the cam 115 has operated lever 113 and rod 111 to reset the lever 98 in the path of the clutch controlling lever 96 which has been rotating with the clutch housing and shaft 60. Then, the dog 101 is reengaged with said lever 98 by means of the spring 105, the arms 106, fingers 109, latches 110 and gage bar 130 then also returning to normal position, as the blank has passed. When the lever 96 strikes the cushion 100 of the lever 98, the clutch is again thrown out and most parts of the machine stop operating. By this time, however the shear member 9 has returned to its raised position and consequently it moves upwardly upon the levers 30, thereby again raising the presser roll 20 to press the sheet against the feed roll 19 which is now constantly rotating, the result being that the sheet is again advanced until it strikes the control fingers 109. The operation described is then automatically completed.

In actual use, I have obtained excellent results from the several details shown and described. Therefore, these details are preferably followed. I wish it understood however that within the scope of the invention as claimed, numerous changes may be made.

I claim:

1. In combination, means for intermittently advancing an elongated sheet in the direction of its length, means for cutting the sheet transversely of its length after each advancement thereof to form a blank, means for Z-bending one cut edge of the blank to later receive the other cut edge thereof, means for advancing the blank after bending its edge, and means transverse to the length of the sheet for imparting a substantially uniform curvature to the blank about an axis parallel with said cut edges thereof.

2. In combination, means for intermittently advancing a sheet, means for cutting the sheet after each advancement thereof to form a blank, means for folding an edge of the blank and curving said blank on an axis parallel with its folded edge, and means for ejecting an undersize remnant of the sheet without permitting it to advance through the machine.

3. In combination, means for intermittently advancing a sheet, means for cutting the sheet after each advancement thereof to form a blank, means for folding an edge of the blank and curving said blank on an axis parallel with its folded edge, means for ejecting any narrow strip which may be left at the end of the sheet, and means for preventing a slightly undersize remnant of the sheet from advancing through the machine.

4. In combination, means for intermittently advancing a sheet, means for cutting the sheet after each advancement thereof to form a blank, means for folding an edge of the blank and curving said blank on an axis parallel with its folded edge, means for ejecting any narrow strip which may be left at the end of the sheet, and means for ejecting any slightly undersize remnant of the sheet without permitting it to advance through the machine.

5. In combination, means for intermittently advancing a sheet and cutting a blank therefrom after each advancement, means for Z-bending one edge of the blank to permit its opposite edge to be later received in the bend, means for stamping the co-acting edges of the blank with interlocking edge-connecting means, and means for curving the bent and stamped blank to facilitate engagement of its co-acting edges with each other.

6. In combination, means for intermittently advancing a sheet, means for cutting a blank from the sheet after each advancement thereof and for simultaneously stamping the adjacent edges of the sheet and blank with edge-connecting means, means for Z-bending one edge of said blank, and means for curving the blank on a line parallel with its bent edge.

7. In combination, means for intermittently advancing a sheet, a movable shear member for cutting a blank from the sheet after each advancement thereof, dies carried by said movable shear member at opposite sides of its cutting edge for stamping one edge of the blank and the adjacent edge of the sheet with edge-connecting means, and bending means spaced from said shear member for Z-bending one edge of the blank to later receive the other edge thereof.

8. A machine of the class described comprising a supporting frame and means for intermittently advancing a sheet thereon, a shear mounted on said frame for cutting a blank from the sheet after each advancement thereof, an edge bender for the blank spaced from the shear, and means whereby said shear and bender may be relatively adjusted to vary the distance between them.

9. A machine of the class described comprising a supporting frame and means for intermittently advancing a sheet thereon, a supplemental frame adjustable along said supporting frame, a shear adjustable bodily with said supplemental frame for cutting a blank from the sheet after each advancement thereof, an edge bender for the blank mounted stationarily on the supporting frame, and ejecting means for undersize remnants of metal carried by said supplemental frame.

10. A machine of the class described comprising a supporting frame and means for intermittently advancing a sheet thereon, a supplemental frame adjustable along said supporting frame, a shear adjustable bodily with said supplemental frame for cutting a blank from the sheet after each advancement thereof, an edge bender for the blank mounted stationarily on the supporting frame, ejecting means for undersize remnants of metal carried by said supplemental frame, and means whereby said ejecting means may be adjusted along said supplemental frame to vary its distance from said shear.

11. A machine of the class described comprising a supporting frame and means for intermittently advancing a sheet thereon, a supplemental frame adjustable along said supporting frame, a shear adjustable bodily with said supplemental frame for cutting a blank from the sheet after each advancement thereof, an edge bender for the blank mounted stationarily on the supporting frame, tracks carried by said supplemental frame and movable bodily therewith, a carrier adjustable along said tracks and means for normally holding it against movement thereon, and an ejector for undersize metal remnants carried by said carrier.

12. In combination, a frame, a metal shear and a metal bender thereon in spaced relation, normally idle operating means for said shear and bender having a master control to be struck and operated by the end of a sheet fed to the machine, whereby to effect shearing and bending, means for automatically moving said master control out of the path of the cut and bent blank, and means for then advancing the blank.

13. In combination, a frame, a metal shear and a metal bender thereon, in spaced relation, normally idle operating means for said shear and bender having a master control to be struck and operated by the end of a sheet fed to the machine, whereby to effect shearing and bending, means for automatically moving said master control out of the path of the cut and bent blank and for holding it in this position, and means for then feeding the sheared and bent blank, including means for automatically releasing the holding means of said master control.

14. In combination, a frame, a metal shear and a metal bender thereon in spaced relation, normally idle operating means for said shear and bender having a master control to be struck and operated by the end of a sheet fed to the machine, whereby to effect shearing and bending, means for automatically moving said master control out of the path of the cut and bent blank, a slide on the frame movable automatically in one direction to hold said moving means for the master control and thereby detain said master control in the position to which it has been moved, and a blank feeding device for then advancing the sheared and bent blank, including a part to strike said slide and return the same to its idle position.

15. In combination, a frame, a shear and a bender spaced apart thereon, normally idle operating means for said shear and bender having a master control in the path of and movable by a sheet fed into the machine, whereby to effect operation of the shear and bender, a gage in the path of the sheet for limiting insertion thereof into the machine, means for automatically moving said gage and said master control out of the path of the bent blank sheared from the sheet, and means for then advancing said blank.

16. In combination, a frame, a shear and a bender spaced apart thereon, normally idle operating means for said shear and bender having a master control in the path of and movable by a sheet fed into the machine, whereby to effect operation of the shear and bender, a gage in the path of the sheet for limiting insertion thereof into the machine, means for automatically moving said gage and said master control out of the path of the bent blank sheared from the sheet and for holding them in the position to which they have been moved, and means for then advancing the sheet, including means for releasing the holding means of said gage and said master control.

17. In combination, a frame, a shear and a bender spaced apart thereon, normally idle operating means for said shear and bender having a master control in the path of and movable by a sheet fed into the machine, whereby to effect operation of the shear and bender, a gage in the path of the sheet for limiting insertion thereof into the machine, means for automatically moving said gage and said master control out of the path of the bent blank sheared from the sheet, a slide automatically movable in one direction to hold the moving means of said gage and master control and thereby detain them in the position to which they have been moved, and a movable blank feeder for then advancing the sheared and bent blank, including a part to strike said slide and return it to inoperative position.

18. In combination, a frame, a shear and a bender spaced apart thereon, said bender having an upwardly swinging bending member, normally idle means for operating said shear and said bending member having a master control in the path of and operable by a sheet fed to the machine, whereby to effect shearing of a blank from the sheet and bending of said blank, an upwardly movable gage in the path of the sheet for limiting its insertion into the machine, said bending member being operable when raised to raise said gage, connecting means between said gage and said master control for moving the latter out of the path of the blank when said gage is raised, and means for then advancing the blank.

19. In combination, a frame, a shear and a bender spaced apart thereon, said bender having an upwardly swinging bending member, normally idle means for operating said shear and said bending member having a master control in the path of and operable by a sheet fed to the machine, whereby to effect shearing of a blank from the sheet and bending of said blank, an upwardly movable gage in the path of the sheet for limiting its insertion into the machine, said bending member being operable when raised to raise said gage, connecting means between said gage and said master control for moving the latter out of the path of the blank when said gage is raised, a horizontally movable slide automatically movable in one direction to hold said gage raised and to thereby detain said master control in the position to which it has been moved, and a horizontally movable blank feeder for advancing the sheared and bent blank, said feeder having a part to strike said slide and return it to an inoperative position.

20. In combination, a frame, a shear and a bender spaced apart thereon, normally idle operating means for said shear and bender, means including an upstanding pivoted arm for throwing said operating means into play when said arm is moved in one direction, an upstanding control finger pivoted to said arm and having its upper end in the path of a sheet fed into the machine, a latch for holding said finger normally rigid with respect to said arm, whereby movement of said finger by the sheet will move said arm, and means for automatically releasing said latch when the bender operates, permitting pivotal movement of said finger to a position out of the path of the sheared and bent blank.

21. In combination, a frame, a shear and a bender spaced apart thereon, normally idle operating means for said shear and bender, means including an upstanding pivoted arm for throwing said operating means into play when said arm is moved in one direction, an upstanding control finger pivoted to said arm and having its upper end in the path of a sheet fed into the machine, a latch for holding said finger normally rigid with respect to said arm, whereby movement of said finger by the sheet will move said arm, means for automatically releasing said latch when the bender operates, and connecting means between said latch and finger for then positively moving the latter upon its pivot to dispose its upper end out of the path of the sheared and bent blank.

22. In combination, a frame, a shear and a bender spaced apart thereon, normally idle operating means for said shear and bender, means including an upstanding pivoted arm for throwing said operating means into play when said arm is moved in one direction, an upstanding control finger pivoted to said arm and having its upper end in the path of a sheet fed into the machine, a latch for holding said finger normally rigid with respect to said arm, whereby movement of said finger by the sheet will move said arm, a movable gage for limiting insertion of a sheet into the machine, said bender having means for raising said gage when the bender operates, and a connection between said gage and latch for releasing the latter when said gage raises, permitting said finger to move out of the path of the sheared and bent blank.

23. In combination, a frame, a shear and a bender spaced apart thereon, normally idle operating means for said shear and bender, means including an upstanding pivoted arm for throwing said operating means into play when said arm is moved in one direction, an upstanding control finger pivoted to said arm and having its upper end in the path of a sheet fed into the machine, a latch for holding said finger normally rigid with respect to said arm, whereby movement of said finger by the sheet will move said arm, a movable gage for limiting insertion of a sheet into the machine, said bender having means for raising said gage when the bender operates, a connection between said gage and latch for releasing the latter when the gage raises, permitting said finger to move out of the path of the sheared and bent blank, a slide automatically movable to hold said gage raised and to thereby detain said finger in the position to which it has been moved, and a blank feeder for advancing the blank, said feeder having a part to strike said slide and return it to an inoperative position.

24. In combination, a frame, a shear and a bender mounted thereon, normally idle means for operating said shear and bender, including a clutch having a projecting control member, a movable abutment normally abutting said control member and holding the clutch against operation, a dog normally holding said abutment against release from said control member, and a master control for releasing said dog, said control extending into the path of a sheet fed to the shear and bender.

25. In combination, a frame, a shear and a bender mounted thereon, normally idle means for operating said shear and bender, including a clutch having a projecting control member, a movable abutment normally abutting said control member and holding the clutch against operation, a dog normally holding said abutment against release from said control member, a master control in the path of a sheet fed to the shear and bender for releasing said dog, means for returning said dog in readiness for re-engagement with said abutment after the sheet has passed the master control, and means for then returning said abutment to its original position whereby to again strike said projecting control member of the clutch and throw the latter out of operation.

26. In combination, a frame, bending means thereon for bending one edge of a blank fed thereto, means on the frame for curving the blank after bending thereof, a proceeding and receding blank feeder for ejecting the blank from the bending means and advancing it to the curving means, means for automatically bringing said curving means into play to advance the sheet therethrough, and latch means applied by the proceeding movement of said feeder for holding the curving means in operation until curving of the blank is completed.

27. In combination, a frame, bending means thereon for bending one edge of a blank fed thereto, means on the frame for curving the blank after bending thereof, a proceeding and receding blank feeder for ejecting the blank from the bending means and advancing it to the curving means, means for automatically bringing said curving means into play to advance the sheet therethrough, latch means applied by the proceeding movement of said feeder for holding said curving means in operation, and means for holding said latch means against release until the blank has passed through the curving means.

28. In combination, a frame, bending means thereon for bending one edge of a blank fed thereto, means on the frame for curving the blank after bending thereof, a proceeding and receding blank feeder for ejecting the blank from the bending means and advancing it to the curving means, means for automatically bringing said curving means into play to advance the sheet therethrough, a depressible member and depressing means therefor disposed in the path of said feeder, whereby to depress said member upon the proceeding stroke of said feeder, said member being then operable to maintain the curving means in operation, and a feeder rising from said member to engage the lower side of the blank and prevent raising of said member to idle position until the blank has passed through the curving means.

29. In combination, a frame, bending means thereon for bending one edge of a blank fed thereto, means on the frame for curving the blank after bending thereof, a proceeding and receding blank feeder for ejecting the blank from the bending means and advancing it to the curving means, means for automatically bringing said curving means into play to advance the sheet therethrough, a depressible member and depressing means therefor disposed in the path of said feeder, whereby to depress said member upon the proceeding stroke of said feeder, a holding member for retaining said curving means in operation, said holding member being engageable with said depressible member when the latter is lowered, whereby to hold said holding member in operative position, and means for holding said depressible member against raising and releasing said holding member until the blank curving operation is completed.

30. In combination, a frame, bending means thereon for bending one edge of a blank fed thereto, means on the frame for curving the blank after bending thereof, a proceeding and receding blank feeder for ejecting the blank from the bending means and advancing it to the curving means, means for automatically bringing said curving means into play to advance the sheet therethrough, a depressible member and depressing means therefor disposed in the path of said feeder, whereby to depress said member upon the proceeding stroke of said feeder, a holding member for retaining said curving means in operation, said holding member having a spring-pressed latch for engagement with said depressible member when the latter is lowered, whereby to retain said holding member in operative position, and means for holding said depressible member against raising until the blank curving operation has been completed.

31. In combination, a frame, bending means thereon for bending one edge of a blank fed thereto, means on the frame for curving the blank after bending thereof, a proceeding and receding blank feeder for ejecting the blank from the bending means and advancing it to the curving means, means for automatically bringing said curving means into play to advance the sheet therethrough, a depressible member operative when depressed to retain the curving means in operation, an arm associated with said depressible member and having a cam in the path of said feeder, whereby to depress said member on the proceeding stroke of the feeder, and means for preventing raising of said depressible member to idle position until the blank has been curved.

32. In combination, a frame, bending means thereon for bending one edge of a blank fed thereto, means on the frame for curving the blank after bending thereof, a proceeding and receding blank feeder for ejecting the blank from the bending means and advancing it to the curving means, means for automatically bringing said curving means into play to advance the sheet therethrough, a holding member for retaining said curving means in operation, said member being movable to its operative position when said curving means is brought into play, a depressible member for engagement with said holding member when depressed to retain it in operative position, an arm associated with said depressible member and having a cam in the proceeding path of said feeder, whereby to depress said depressible member, and a feeler rising from said depressible member to engage the lower side of the blank and prevent raising of said depressible member until the blank has passed said feeler.

33. In combination, a frame, a shear thereon for cutting a blank from an intermittently advanced sheet after each advancement thereof, means on the frame beyond said shear for working upon the sheet, a proceeding and receding carriage on the frame having releasable feed rolls active to feed the sheet to said working means prior to the shearing operation, means for releasing said feed rolls at the completion of the sheet feeding operation, blank-gripping means carried by said carriage, and means for applying said gripping means and moving said carriage to advance the blank.

34. In combination, a frame, a shear thereon for cutting a blank from an intermittently advanced sheet after each advancement thereof, means on the frame beyond said shear for working upon the sheet, a proceeding and receding carriage on the frame having releasable feed rolls active to feed the sheet to said working means prior to the shearing operation, means for releasing said feed rolls at the completion of the sheet feeding operation, blank-gripping means carried by said carriage, including a rock shaft for effecting gripping of the blank, a crank arm on said rock shaft, and means connected to said crank arm for first turning said rock shaft to grip the blank and for then moving the carriage to advance the blank.

35. A sheet feeding device comprising a frame, a carriage thereon and means for moving said carriage at intervals, a rotary sheet feeding roll mounted on said carriage, means for throwing said roll out of operation prior to movement of the carriage, and means on the carriage for gripping the sheet while said carriage is being moved.

36. A sheet working machine comprising an anterior mechanism for operating upon a sheet, a posterior mechanism for further operating upon the sheet, a normally stationary carriage mounted for movement toward the posterior mechanism, a sheet-feeding roll mounted on said carriage and operable to move the sheet into operative relation with the anterior mechanism, means for driving said roll, means for automatically throwing said roll-driving means out of play when the sheet is properly positioned, means for then operating the anterior mechanism, means for then moving the carriage toward the posterior mechanism, sheet-gripping means on said carriage, and means for throwing said sheet-gripping means into play when the carriage is moved toward said posterior mechanism.

37. A metal bending machine comprising a support for a metal sheet, a die for clamping the sheet against said support, means for bending an edge of the sheet around a portion of said die, and means for then moving the die horizontally in one direction out of engagement with the bend, then moving said die vertically to a plane above the bend, then moving said die horizontally in the other direction to a position over the bend, and finally moving said die downwardly toward the support to flatten said bend.

38. A metal bending machine comprising a support for a metal sheet, a die for clamping the sheet against said support, a cam operated lever carrying said die for effecting movement thereof toward and from the sheet, and means connected to said lever for moving the same to place the die on the bend of the sheet after forming the latter, whereby further operation of said lever may flatten the bend by means of said die.

39. A metal bending machine comprising a support for a metal sheet, a die for clamping the sheet against said support, a cam operated lever carrying said die for effecting movement thereof toward and from the sheet, and means connected to said lever for moving the same to withdraw the die from the bend as said die is moved away from the sheet, and to then effect positioning of the die on the bend, whereby further operation of said lever will flatten the bend by means of said die.

40. The combination with a metal working machine having a movable metal working member; of a gage in the path of a sheet fed to the machine, said metal working member having a portion to move said gage out of the path of the sheet when said member is operated, means for holding said gage in the position to which it is moved, and a sheet feeder for then advancing the sheet, said sheet feeder having a portion to release said gage holding means.

41. The combination with a metal working machine having a movable metal working member; of a gage in the path of a sheet fed to the machine, said metal working member having a portion to move said gage out of the path of the sheet when said member is operated, a slide movable in one direction to hold said gage in the position to which it has been moved, said metal working machine having means for moving said slide to operative position, and a feeder for advancing the sheet when the gage is held, said feeder having a portion to strike and release said slide.

42. The combination with a metal working machine having a movable metal working member; of a gage in the path of a sheet fed to the machine, said metal working member having a portion to move said gage out of the path of the sheet when said member is operated, a slide for holding said gage in the position to which it has been moved, a reciprocating operating member for said metal working member, a cam on said operating member for moving said slide to operative position, and releasing means for said slide.

43. The combination with a metal working machine having a movable metal working member; of a gage in the path of a sheet fed to the machine, said metal working member having a portion to move said gage out of the path of the sheet when said member is operated, a slide for holding said gage in the position to which it has been moved, a reciprocatory operating member for said metal working member, a cam on said operating member for moving said slide to operative position, and a feeder for advancing the sheet while the gage is held, said feeder having a portion to strike and release said slide.

44. The combination with a sheet metal working machine; of a gage for limiting the movement of a sheet fed to said machine, normally idle operating means for said machine having a master control in the path of the sheet adjacent said gage, whereby to operate the machine when the sheet strikes the control and gage, means for automatically moving said gage out of the path of the sheet when the machine operates, and a connection between said gage and said master control for moving the latter out of the path of the sheet.

45. The combination with a sheet metal working machine; of a gage for limiting the movement of a sheet fed to said machine, normally idle operating means for said machine having a control arm and a control finger pivoted to said arm with its free end in the path of the sheet adjacent said gage, a latch normally holding said finger against movement on its pivot, whereby movement of said finger by the sheet will move said arm to bring the machine into operation, means for automatically moving said gage out of the path of the sheet when the machine operates, and a connection between said latch and gage for releasing the former by means of the latter, permitting movement of said finger out of the path of the sheet.

46. The combination with a sheet metal working machine; of a gage for limiting the movement of a sheet fed to said machine, normally idle operating means for said machine having a master control in the path of the sheet adjacent said gage, whereby to operate the machine when the sheet strikes the control and gage, means for then moving said gage and control out of the path of the sheet, common means for holding said gage and control in the positions to which they have been moved, and a feeder for then advancing the sheet, said feeder having a portion to release said holding means.

47. The combination with a sheet metal working machine: of a gage for limiting the movement of a sheet fed to said machine, normally idle operating means for said machine having a master control in the path of the sheet adjacent said gage, whereby to operate the machine when the sheet strikes the control and gage, means for then moving said gage and control out of the path of the sheet, a slide movable in one direction for holding said gage and control in the positions to which they have been moved, and a feeder for then advancing the sheet, said feeder having a portion to move said slide to inoperative position.

48. A machine of the class described comprising sheet metal working means normally idle operating means therefor having a control arm, a control finger pivoted on said control arm and extending into the path of the sheet fed to the machine, a latch for normally preventing movement of said finger on its pivot, whereby the sheet may bodily move said finger and arm to bring the machine into operation, and means for then releasing said latch to permit the finger to move out of the path of the sheet.

49. A machine of the class described comprising sheet metal working means, normally idle operating means therefor including a clutch having a control for holding the clutch against action when held, a movable abutment normally engaging said control and holding the same, a dog normally holding said abutment, and a control device in the path of the sheet for releasing said dog.

50. A machine of the class described comprising sheet metal working means, normally idle operating means therefor including a clutch having a control for holding the clutch against action when held, a movable abutment normally engaging said lever and holding the same, a dog normally holding said abutment, an arm connected with said dog for releasing the same, a finger pivoted to said arm and extending into the path of the sheet, a latch normally holding said finger against movement on its pivot, whereby movement of said finger by the sheet will move said arm to release said dog, and releasing means for said latch.

51. A machine of the class described comprising sheet metal working and feeding means including a sheet engaging member for bringing the machine into operation when moved into contact with the sheet, means for moving said member to operative position, means for holding said member in operative position, and means for releasing said holding means when the sheet has passed.

52. A machine of the class described comprising sheet metal working and feeding means including a sheet engaging member for bringing the machine into operation when moved into contact with the sheet, means for moving said member to operative position, a movable holding member movable to a predetermined position when said sheet engaging member moves into contact with the sheet, a movable stop co-operable with said holding member for retaining it in operative position, and means for holding said stop against release until the sheet has passed.

53. A machine of the class described comprising sheet metal working and feeding means including a sheet engaging member for bringing the machine into operation when moved into contact with the sheet, means for moving said member to operative position, a movable holding member movable to a predetermined position when said sheet engaging member moves into contact with the sheet, a movable stop co-operable with said holding member for retaining it in operative position, and a sheet engaging feeler extending from said stop for holding it against release until the sheet has passed said feeler.

54. A machine of the class described comprising sheet metal working and feeding means including a sheet engaging member for bringing the machine into operation when moved into contact with the sheet, means for moving said member to operative position, a movable holding member movable to a predetermined position when said sheet engaging member moves into contact with the sheet, a feeder for advancing the sheet to said sheet engaging member, a movable stop for engaging said holding member and retaining the same in operative position, means operated by the movement of said feeder for moving said stop into engagement with said holding member, and means for holding said stop in operative position until the sheet has passed.

55. A machine of the class described comprising sheet metal working and feeding means including a sheet engaging member for bringing the machine into operation when moved into contact with the sheet, means for moving said member to operative position, a movable holding member movable to a predetermined position when said sheet engaging member moves into contact with the sheet, a feeder for advancing the sheet to said sheet engaging member, a movable stop for engaging said holding member and retaining the same in operative position, a cam connected with said stop and disposed in the path of said feeder for operation thereby to move the stop to operative position, and means for holding said stop in operative position until the sheet has passed.

56. A machine of the class described comprising sheet metal working and feeding means including a sheet engaging member for bringing the machine into operation when moved into contact with the sheet, means for moving said member to operative position, an arm movable to a predetermined position when said sheet engaging member moves into contact with the sheet, a movable stop for engagment with said arm to retain it in operative position, a swinging arm connected with said stop and having a cam, a feeder for feeding the sheet to said sheet engaging member and for engaging said cam to move said stop to operative position, and a sheet engaging feeler extending from said stop to hold it against release until the sheet has passed.

In testimony whereof I have hereunto affixed my signature.

LONZO BAXTER SMITH.